(12) United States Patent
Swift et al.

(10) Patent No.: US 7,433,023 B2
(45) Date of Patent: Oct. 7, 2008

(54) APPARATUSES AND METHODS FOR MEASURING HEAD SUSPENSIONS AND HEAD SUSPENSION ASSEMBLIES

(75) Inventors: David R. Swift, Glencoe, MN (US);
Mark T. Girard, Hutchinson, MN (US);
Joseph P. Tracy, Hutchinson, MN (US)

(73) Assignee: Applied Kinetics, Inc., Hutchinson, MN (US)

( * ) Notice: Subject to any disclaimer, the term of this patent is extended or adjusted under 35 U.S.C. 154(b) by 0 days.

(21) Appl. No.: 11/230,981

(22) Filed: Sep. 20, 2005

(65) Prior Publication Data

US 2006/0109453 A1 May 25, 2006

Related U.S. Application Data

(60) Provisional application No. 60/611,473, filed on Sep. 20, 2004.

(51) Int. Cl.
*G01C 3/08* (2006.01)
(52) U.S. Cl. .................. 356/4.01; 356/4.02; 356/4.1
(58) Field of Classification Search ....... 356/3.01–3.15, 356/4.01–4.1, 5.01–5.15, 6–22, 28, 28.5
See application file for complete search history.

(56) References Cited

U.S. PATENT DOCUMENTS

| 5,353,109 | A | * | 10/1994 | Langdon et al. ............ 356/28.5 |
| 5,636,013 | A | | 6/1997 | Swift |
| 5,712,463 | A | | 1/1998 | Singh et al. |
| 5,714,762 | A | | 2/1998 | Li et al. |
| 5,859,694 | A | * | 1/1999 | Galtier et al. .............. 356/28.5 |
| 5,929,987 | A | | 7/1999 | Hayes |
| 6,011,239 | A | | 1/2000 | Singh et al. |
| 6,288,876 | B1 | | 9/2001 | Albrecht et al. |
| 6,347,460 | B1 | * | 2/2002 | Forrer et al. .................. 33/626 |
| 2002/0027651 | A1 | * | 3/2002 | Jackson et al. ......... 356/139.09 |
| 2002/0108427 | A1 | | 8/2002 | Matsushita |
| 2003/0019853 | A1 | | 1/2003 | Hayen et al. |

* cited by examiner

*Primary Examiner*—Thomas H. Tarcza
*Assistant Examiner*—Luke D Ratcliffe
(74) *Attorney, Agent, or Firm*—Kagan Binder, PLLC

(57) ABSTRACT

The present invention provides apparatuses and methods for determining spatial information of a workpiece surface positioned in a predetermined coordinate system. Apparatuses and methods of the present invention can be used to determine one or more coordinates of one or more measurement locations of a workpiece within a predetermined coordinate system. Such coordinates can be used to define points, lines, and/or surfaces of the workpiece within the coordinate system. In one exemplary application, apparatuses and methods of the present invention can be used to determine spatial information of surfaces of head suspensions or head suspension assemblies such as those that are generally utilized in dynamic storage devices such as magnetic disk drives. Such spatial information can be used to determine z-height and/or static attitude, for example.

39 Claims, 21 Drawing Sheets

APPARATUSES AND METHODS FOR MEASURING HEAD SUSPENSIONS AND HEAD SUSPENSION ASSEMBLIES

This application claims the benefit of U.S. Provisional Application Ser. No. 60/611,473, filed Sep. 20, 2004, entitled "APPARATUSES AND METHODS FOR MEASURING HEAD SUSPENSION AND HEAD SUSPENSION ASSEMBLIES," which application is incorporated herein by reference in its entirety for all purposes.

TECHNICAL FIELD

The present invention relates to apparatuses and methods for determining spatial information of a workpiece surface positioned in a predetermined coordinate system. More particularly, the present invention relates to apparatuses and methods for determining spatial information of surfaces of head suspensions or head suspension assemblies such as those that are generally utilized in dynamic storage devices such as magnetic disk drives.

BACKGROUND

Components of many electronic, electro-mechanical, and optical devices and systems need to be assembled with precise alignment to assure optimal performance. In the case of certain magnetic recording disk drives, for example, a read/write head needs to be carefully positioned with respect to a surface of a disk during use to assure optimum performance and to avoid crashing the head into the disk and causing damage.

Magnetic disk drives that utilize a head assembly for reading and/or writing data on a rotatable magnetic disk are well known in the art. In such drives, the head assembly is typically attached to an actuator arm by a head suspension assembly. A head suspension assembly includes a head suspension and an aerodynamically designed slider onto which a read/write head is provided so that the head assembly can be positioned very close to the disk surface. Such a head position during usage, that is, where the head is positioned over a spinning disk, is defined by balancing a lift force caused by an air bearing that spins with the disk acting upon the aerodynamically designed slider and an opposite bias force of the head suspension. As such, the slider and head fly over the spinning disk at precisely determined heights.

Head suspensions generally include an elongated load beam with a gimbal flexure located at a distal end of the load beam and a base plate or other mounting means at a proximal end of the load beam. According to a typical head suspension construction, the gimbal flexure comprises a platform or tongue suspended by spring or gimbal arms. The slider is mounted to the tongue thereby forming a head suspension assembly. The slider includes a read/write magnetic transducer provided on the slider and the slider is aerodynamically shaped to use an air bearing generated by a spinning disk to produce a lift force. During operation of such a disk drive, the gimbal arms permit the slider to pitch and roll about a load dimple or load point of the load beam, thereby allowing the slider to follow the disk surface even as such may fluctuate.

The head slider is precisely mounted to the flexure or slider mounting tongue of a head suspension at a specific orientation so as to fly at a predetermined relationship to the plane of the disk surface. During manufacturing and assembling of the head suspension assembly, any lack of precision in forming or assembling the individual components can contribute to a deviation in the desired relationship of the surfaces of these components. A buildup of such deviations from tolerance limits and other parameters in the individual components can cause a buildup of deviation from the desired relationship of the head slider to the associated disk surface in the complete head suspension assembly. The parameters of static roll attitude and static pitch attitude in the head suspension assembly generally result from these inherent manufacturing and assembly tolerance buildups.

Ideally, for optimum operation of a disk drive as a whole, during assembly of a head slider to a slider mounting tongue, the plane of a load beam mounting surface datum and the plane of a head slider surface datum should be in a predetermined relationship to each other. The load beam mounting surface datum and the slider surface datum are usually planar surfaces that are used as reference points or surfaces in establishing the relationship of the plane of an actuator mounting surface and the plane of the surface of the head slider surface relative to each other. The upper and lower planar surfaces of the head slider are also manufactured according to specifications usually requiring them to be essentially or nominally parallel to each other.

In practice, several optical methods can be used to measure the angle of component surfaces, such as laser triangulation or interferometry. Another optical method that can be used is known as autocollimation. An autocollimator is able to measure small surface angles with very high sensitivity. Light is passed through a lens where it is collimated prior to exiting the instrument. The collimated light is then directed toward a surface, the angle of which is to be determined. After being reflected by the surface to be measured, light enters the autocollimator and is focused by the lens. Angular deviation of the surface from normal to the collimated light will cause the returned light to be laterally displaced with respect to a measurement device such as a position sensing device. This lateral displacement is generally proportional to the angle of the surface and the focal length of the lens. An advantage of such a device is that the angle measurement is independent of the working distance of the lens or the distance between the instrument and the component being measured. However, one limitation of this type of device is that it is difficult to use and to measure poorly reflective or non-reflective surfaces.

In the case of measuring the angle of a surface for receiving a slider, accurate information for the mounting or attachment area of the surface is desired. In typical autocollimator based static attitude measurement, the angular information for the mounting area is provided as an average angle for the mounting area. In certain cases, however, it may be desirable to measure the angle of more specific or distinct location of the mounting area such as if the mounting area has small or localized high points on the surface. Such localized high points could affect the angle of a slider mounted to the surface.

SUMMARY

The present invention provides apparatuses and methods for determining spatial information of a workpiece surface positioned in a predetermined coordinate system. For example, apparatuses and methods of the present invention can be used to determine one or more coordinates of one or more measurement locations of a workpiece within a predetermined coordinate system. Such coordinates can be used to define points, lines, and/or surfaces of the workpiece within the coordinate system. In one exemplary application, apparatuses and methods of the present invention can be used to determine spatial information of surfaces of head suspensions or head suspension assemblies such as those that are generally utilized in dynamic storage devices such as magnetic disk drives. Such spatial information can be used to determine z-height and/or static attitude, for example.

One aspect of the present invention provides an optical measurement device for determining at least one coordinate of a measurement location on a surface of a workpiece positioned in a known coordinate system by a workpiece support. The optical measurement device preferably comprises a source of a plurality of measurement beams, means for directing the plurality of measurement beams to concurrently impinge upon a surface of a workpiece, and an imaging system. Each beam of the plurality of measurement beams preferably illuminates an independent predetermined measurement location on the surface of the workpiece when the workpiece is supported and positioned by a workpiece support. The imaging system preferably comprises a detector that can view at least one of the illuminated measurement locations along a predetermined viewing direction. Preferably, the detector can be setup to provide information indicative of at least one coordinate of the at least one of the illuminated measurement locations as viewed by the imaging system along the predetermined viewing direction.

Another aspect of the invention provides an optical measurement device having a steering device. The optical measurement device can be used for determining at least one coordinate of a measurement location of a surface of a workpiece positioned in a known coordinate system by a workpiece support. The optical measurement device preferably comprises a light source, a beam divider, a steering device, and an imaging system. The beam divider is preferably operatively positioned relative to the light source. Also, the beam divider is preferably capable of dividing light from the light source into a plurality of independent measurement beams. Preferably, the steering device is capable of positioning at least one of the plurality of measurement beams to impinge upon and illuminate a measurement location on a surface of a workpiece as supported by a workpiece support. The imaging system preferably comprises a detector that can view at least one of the plurality of illuminated measurement locations along a predetermined viewing direction. Preferably, the detector can be setup to provide information indicative of at least one coordinate of the at least one of the plurality of illuminated measurement locations as viewed by the imaging system along the predetermined viewing direction.

Another aspect of the present invention provides a method for determining at least one coordinate of a measurement location of a surface of a workpiece positioned in a known coordinate system by a workpiece support. The method preferably comprises the steps of providing a workpiece, supporting and positioning the workpiece on a workpiece support within a predetermined coordinate system, concurrently impinging a surface of the workpiece with a plurality of light beams to provide a plurality of illuminated measurement locations, viewing at least one of the plurality of illuminated measurement locations along a predetermined viewing direction within the predetermined coordinate system, and determining at least one coordinate of the at least one of the plurality of illuminated measurement locations in the predetermined coordinate system.

Yet another aspect of the present invention provides a method for determining the angular orientation of a surface of a workpiece positioned in a known coordinate system. The method comprises the steps of providing a workpiece, supporting and positioning the workpiece on a workpiece support within an x-y-z coordinate system, concurrently impinging a surface of the workpiece with at least three light beams to concurrently illuminate three independent measurement locations on the surface of the workpiece, viewing the three independent illuminated measurement locations along first and second distinct viewing directions within the x-y-z coordinate system, and determining the x, y, and z coordinates of each of the three independent illuminated measurement locations.

BRIEF DESCRIPTION OF THE DRAWINGS

These and other features, aspects, and advantages of the present invention will become better understood with regard to the following description, appended claims, and accompanying drawings where:

DETAILED DESCRIPTION

Triangulation techniques can be used to establish the distance between two points or the relative position of two or more points. Triangulation relies on geometry and the knowledge of certain distances and/or angles to determine the position of a point, such as the position of the point in a predetermined coordinate system. Optical systems that use triangulation are known. One type of optical system that uses triangulation is known as a point range sensor and is used to determine the distance between the sensor and a target object. Other optical systems that use triangulation are known. However, one limitation of these systems is that only two coordinates of a point located in a three coordinate system can be resolved as described in greater detail below.

Figure 1:
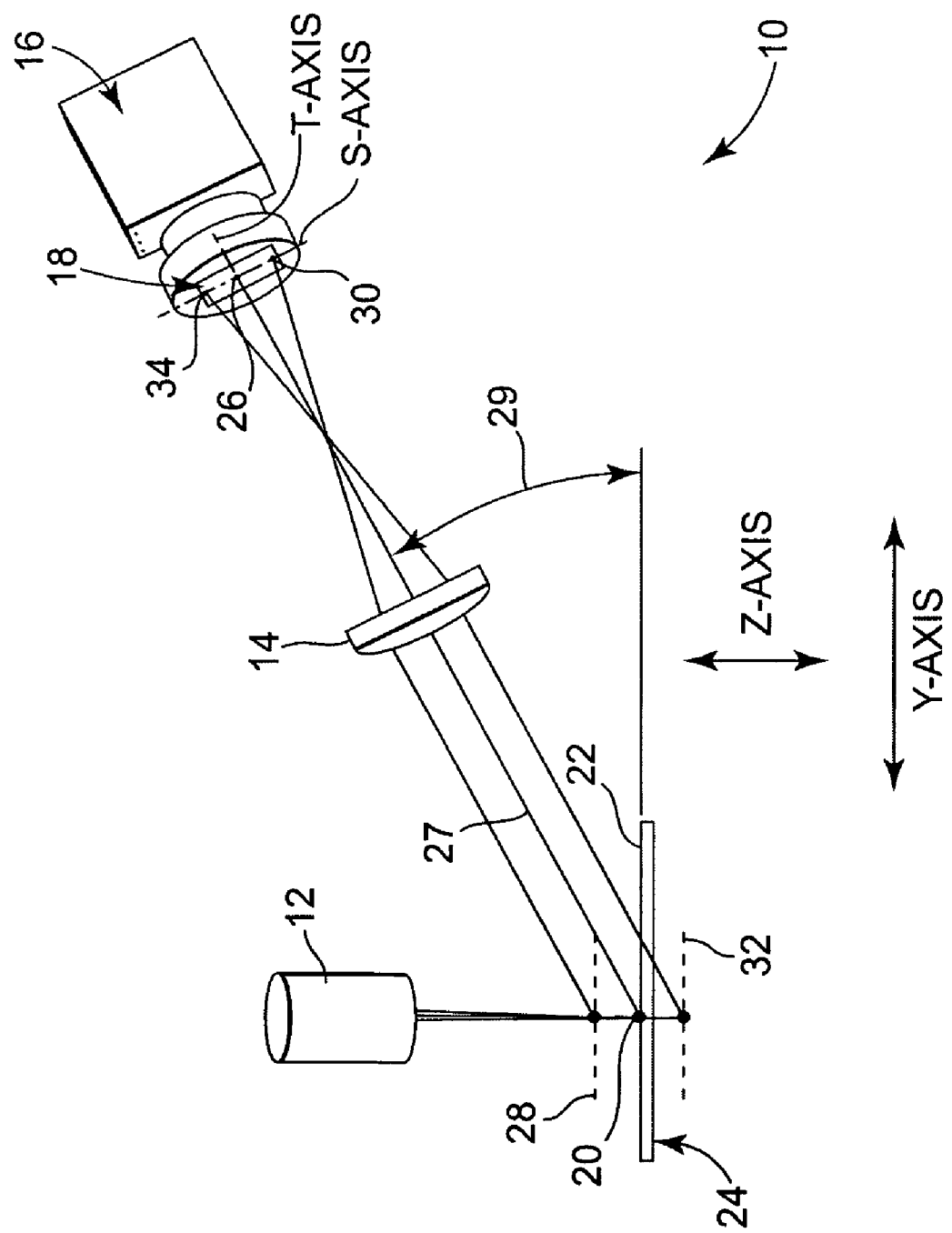
FIG. 1 is a schematic view of an optical triangulation system positioned relative to an x-y-z coordinate system and having a light source, image lens, and a camera and showing in particular how the optical triangulation system can be setup to provide a z-coordinate of an illuminated measurement location on a workpiece surface.

An optical triangulation system 10 is schematically shown in FIG. 1. The triangulation system 10 includes a light source 12, an imaging lens 14, and a camera 16 having a position sensing detector 18. The position sensing detector 18 is an important component of the triangulation system 10 and can sense light that is impinging on the detector 18. The detector 18 can also provide positional information related to where the light is impinging on the detector 18. For example, one type of device that can be used as the position sensing detector 18 is a charge coupled device or CCD. These devices are conventionally known and a typical CCD includes a semiconductor device that has an array of light sensitive elements. The individual light sensitive elements of the array of light sensitive elements are provided in a known geometric arrangement relative to each other. This type of device can be setup to relate the position of light impinging on the array of light sensitive elements with the position of the source of light on a reference surface. Generally, such setup relies on knowledge of the geometry of the system in which the CCD is used, such as the relative positions of the array of light sensitive elements and the reference surface, for example.

In order to setup the triangulation system 10, the light source 12, which is typically a laser, illuminates a focused spot 20 on a surface 22 of a workpiece 24. The surface 22 is positioned relative to an x-y-z coordinate system. For example, the surface 22 is preferably coplanar with an x-y plane of the x-y-z coordinate system. As shown, the light source 12 is normally incident to the surface 22. Alternatively, the light source 12 can be projected onto the surface 22 at an angle, however, at an angle other than 90 degrees the spot 20 may translate across the surface 22 as the surface 22 moves in the z-direction (during setup, for example). This generally, makes it more difficult to perform the calculations required to setup the system as it adds an additional factor that needs to be accounted for. As such, a normally incident light source is preferred.

An image 26 of the illuminated spot 20 is thus seen by the detector 18 as viewed along a viewing direction 27 that makes an angle 29 with the surface 22. As the surface 22 is moved in the z-direction, the spot 20 also moves in the z-direction and, as a result, the image 26 is seen to move along the s-axis of the detector 18 in a manner proportional to the movement of the spot 20 in the z-direction. For example, if the surface 22 is moved by a known distance from a known position, as shown, to the location of the broken line indicated by reference numeral 28, image 26 will move along the s-axis of the detector 18 by distance that is proportional to the distance that the surface 22 is moved. As such, the detector 18 will see the image identified by reference numeral 30. Because the detector 18 can sense the position of light impinging on it, the distance (as defined by the array of light sensitive elements of the detector 18, for example) between the image 26 and the image 30 can be used to define a correlation between the distance that the surface 22 has been moved from its initial position and the distance between the image 26 and the image 30 on the detector 18. Likewise, if the surface 22 is moved by a known distance from a known position, as shown, (in an opposite direction) to the location of the broken line indicated by reference numeral 32, the image 26 will move along the s-axis of the detector 18 by a distance that is proportional to the distance that the surface 22 is moved. Here, the detector 18 will see the image identified by reference numeral 34 and a similar setup approach can be used. When the triangulation system 10 is setup in this manner, the z-coordinate of an illuminated spot on the surface 22 of the workpiece 24 can be determined in an x-y-z coordinate system.

Figure 2:
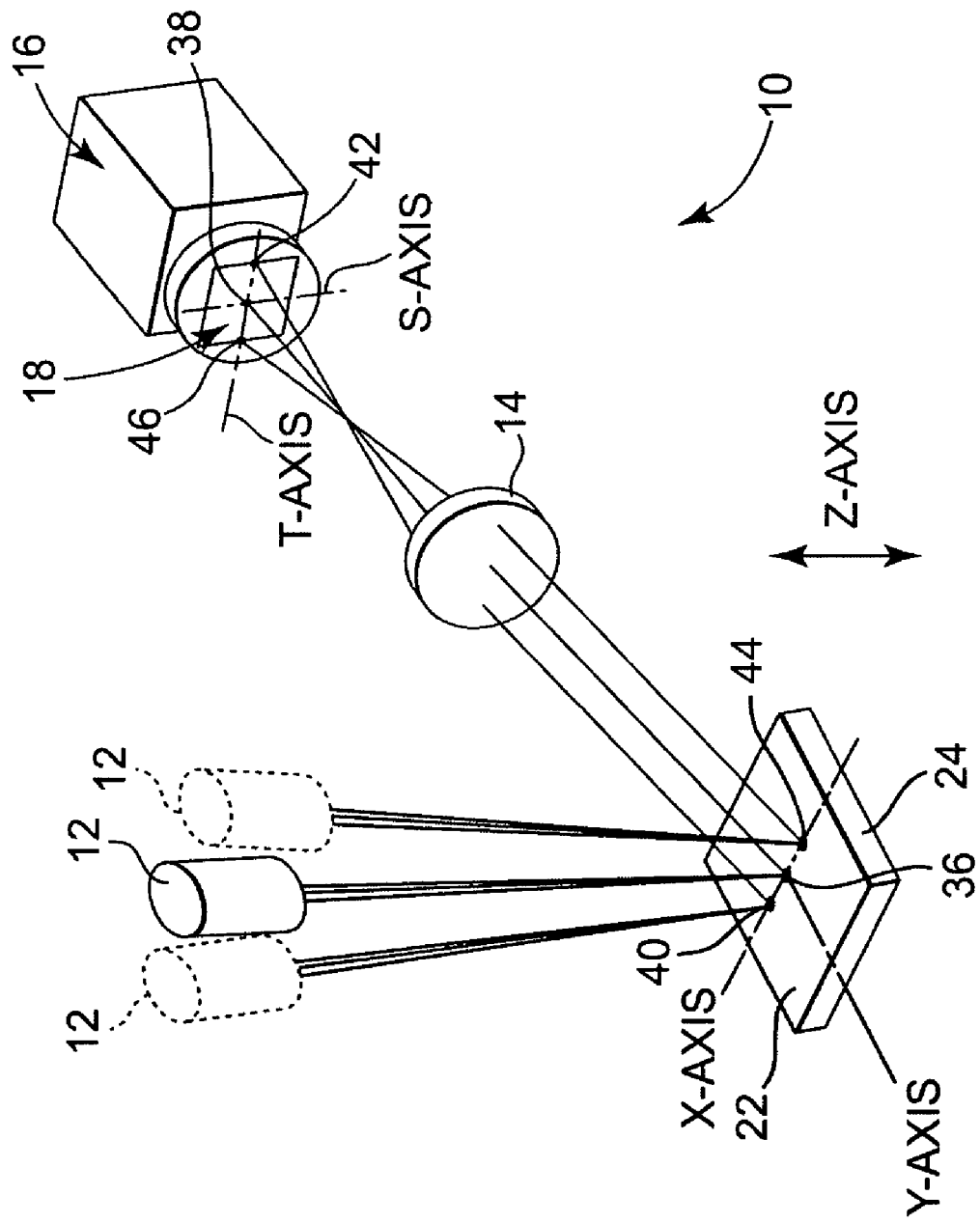
FIG. 2 is schematic view of the optical triangulation system of FIG. 1 showing in particular how the optical triangulation system can be setup to provide a x-coordinate of an illuminated measurement location on a workpiece surface.

The detector 18 also includes a t-axis that is perpendicular to the s-axis, as illustrated, and positional information along the t-axis of the detector 18 can also be obtained for determining an x-coordinate of an illuminated spot on the surface 22 of the workpiece 24. In particular, the t-axis can be setup in a manner similar to that described above. Referring to FIG. 2, the triangulation system 10 is shown wherein the light source 12 illuminates a spot 36 on the surface 22. The detector 18 thus sees an image 38 of the spot 36. For setup purposes, an illuminated spot 40 can be provided on the surface 22 (by moving the light source 12 along the x-axis as shown, for example). As such, the detector 18 sees an image 42 of the spot 40. The light source 12 can also be moved in the opposite direction to provide an illuminated spot 44 on the surface 22, and the detector 18 thus sees an image 46 of the spot 40. The illuminated spot 40 and/or the illuminated spot 44 (or any additional illuminated spots) can be used to define a positional correlation between the x-axis of the coordinate system and the t-axis of the detector 18. As such, when properly setup, the x-coordinate of an illuminated spot on the surface 22 of the workpiece 24 can be determined.

When setup as above (with respect to FIGS. 1 and 2), the triangulation system 10 cannot definitively determine the y-coordinate of an illuminated spot on the surface 22 of the workpiece 24 unless other factors are eliminated or known such as by holding the surface 22 constant in the z-direction. This is because the detector 18 cannot distinguish between a change in the position of an illuminated spot along the z-axis from a change in the position of the illuminated spot along the y-axis. More specifically, a change in the position of an illuminated spot along the z-axis results in a corresponding movement of the image of the illuminated spot along the s-axis of the detector 18. A change in the position of the illuminated spot along the y-axis also results in a corresponding movement of the image of the illuminated spot along the s-axis of the detector 18. Because of this, the detector 18 cannot distinguish between such a change in position of an illuminated spot in the y-axis and the z-axis.

Figure 3:
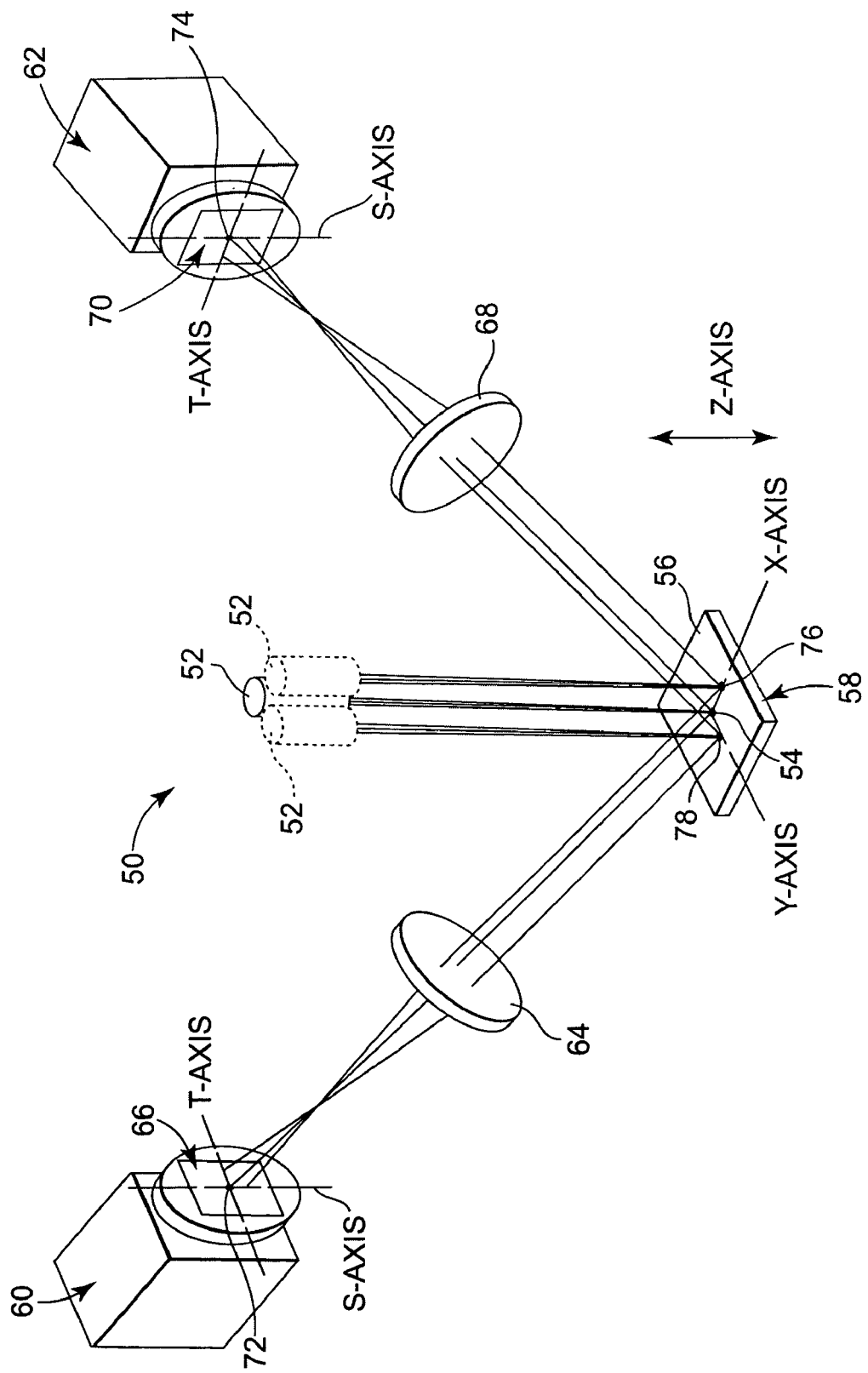
FIG. 3 is a schematic view of an optical device in accordance with the present invention positioned relative to an x-y-z coordinate system and having first and second cameras, first and second imaging lenses, respectively, and a light source that can provide at least one illuminated measurement location on a surface of a workpiece.

Apparatuses and methods in accordance with the present invention address this problem of being able to determine two dimensions as setup by viewing an illuminated spot from at least two different locations. An optical measurement system 50 in accordance with the present invention is illustrated schematically in FIG. 3. The measurement system 50, as shown, includes a light source 52, which preferably includes a laser that can illuminate a focused spot 54 on a surface 56 of a workpiece 58. Preferably, the illuminated spot 54 can be viewed from different locations (along different viewing paths, for example) by using first and second cameras 60 and 62, as shown. However, it is noted that a single camera may be used that moves between different predetermined or known viewing positions in accordance with the present invention. Moreover, a camera can be stationary while the optical path moves. The first camera 60 includes an imaging lens 64 that can provide an image 72 of the illuminated spot 54 on to a detector 66 of the first camera 60. Similarly, the second camera 62 includes an imaging lens 68 that can provide an image 74 of the illuminated spot 54 onto the detector 70 of the second camera 62.

In the system 50, the first camera 60 can be setup in the z-direction by moving the surface 56 of the workpiece 58 along the z-axis thereby moving an image of the spot 54 on the s-axis of the detector 66. The first camera 60 can also be setup in the y-direction by providing an illuminated spot 76 on the surface 56 that is spaced from the spot 54 at a known distance along the y-axis as illustrated (such as by moving the light source 52 as shown, for example). The y-direction setup can be made by correlating the distance between an image of the spot 54 on the detector 66 and an image of the spot 76 on the detector 66 to the distance between the spot 54 and 56. One problem with this setup, however, is that the first camera 60, by itself, cannot resolve the z and x axes as both appear as a movement in the s-axis of detector 66 during such a setup. Moreover, when the second camera 62 is setup in the same way, the second camera 62, by itself, cannot resolve the z and y axes as both also appear as a movement in the s-axis of the detector 74 during setup. In any case, the first camera 60 can resolve y and the second camera 62 can resolve x.

However, by using information from the first and second cameras 60 and 62, and information including the geometry of the system 50, the x, y, and z axes can be resolved by using known triangulation and mathematical techniques. More specifically, the viewing directions of the first and second cameras 60 and 62 are each provided at a predetermined known angle to the surface 56 of the workpiece 58 (when used as a reference surface for setup purposes). The viewing directions are also preferably orthogonal to each other but may be provided at any desired angle (an angle of 90 degrees generally simplifies the mathematics required for resolving the x, y, and z axes). Also, distances between setup spots on the surface 56 and the detectors 66 and 74 can be measured and used to setup the system 50. By using this type of setup procedure, four known parameters about an illuminated spot on the surface 56 (information from the s and t axes from each of the cameras 60 and 62) along with the geometry of the system 50 can be used to resolve three unknown parameters (x, y, and z coordinates of the spot).

Accordingly, the measurement system 50 can provide the x, y, and z coordinates for one or more illuminated spots on a surface of a workpiece. This coordinate information can be used to determine points, lines, and planes related to a workpiece in a predetermined coordinate system as described with respect to an exemplary application as described in more detail below.

Figure 4:
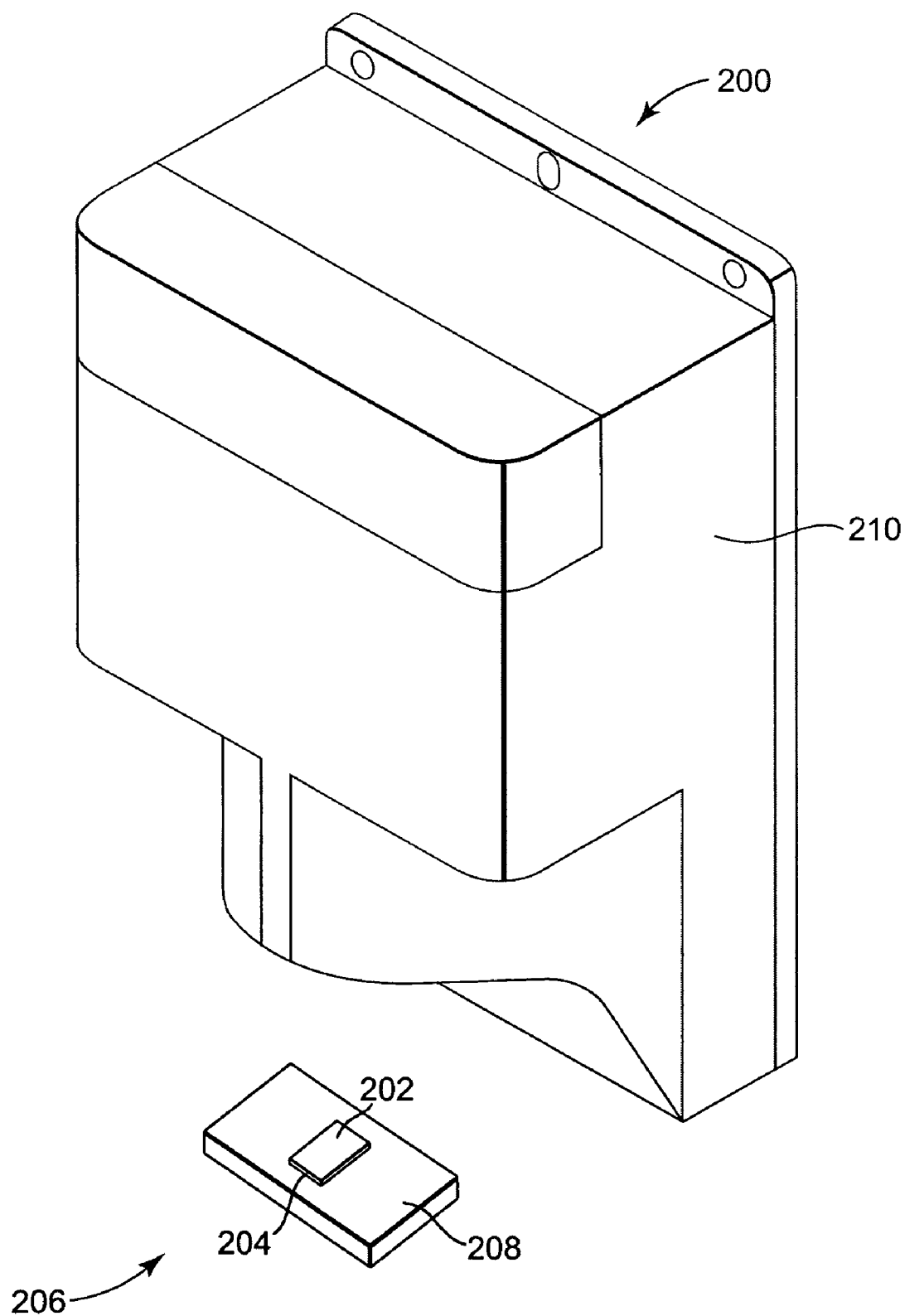
FIG. 4 is a perspective view of one embodiment of an optical measurement device in accordance with the present invention showing in particular a workpiece supported by a workpiece support in a measurement position relative to the optical measurement device.

Referring to FIG. 4, an exemplary embodiment of a measurement device 200 in accordance with the present invention is illustrated. As described in more detail below, the measurement device 200 can be used to measure the angular orientation as well as relative positional information of a surface 202 of a component 204 within a predetermined coordinate system. As schematically shown, the component 204 is positioned in a measurement position 206 relative to the device 200 as supported by a workpiece holder 208. In accordance with the present invention, the component 202 may comprise a head suspension or a head suspension assembly such as those used for dynamic storage devices and the like. Such head suspensions and head suspension assemblies are well-known and important functional parameters have been developed to ensure proper head position within dynamic storage devices. For example, Applicant's copending non-provisional patent application, "Apparatuses and Methods for Laser Processing of Head Suspension Components," filed on Sep. 13, 2004 by Mark T. Girard and having U.S. Ser. No. 10/940,160 describes such heads suspensions and head suspension assemblies and is incorporated by reference herein for all purposes. As such, static attitude (both roll static attitude and pitch static attitude) as well as z-height of a head suspension or head suspension assembly can be measured in accordance with the present invention. However, it is noted that any head suspension or head suspension assembly or similar component having one or more surfaces for which positional or angular information within a predetermined coordinate system is desired can be measured in accordance with the present invention.

In one aspect of the invention, the device 200 may be integrated into a manufacturing line or system. For example, the device 200 can be used as a station of a head suspension assembly manufacturing system. In some of these systems, head suspensions are provided on a carrier strip and are moved from station to station by advancing the carrier strip in a processing direction. The device 200 can be integrated with such a system so that a head suspension or head suspension assembly carried by a carrier strip can be positioned in the measurement position 206 of the device 200. The device 200 can be used to measure static attitude in accordance with the invention. A static attitude measurement can then be used to adjust static attitude, if desired. Also, head suspensions or head suspension assemblies can be provided to the measurement position 206 individually (not as part of a carrier strip) by using a fixture, carrier, or tray that can be presented to the measurement position 206 such as by using an automated device or mechanism. Workpiece holder 208 can be designed based upon such systems and may include elements for accurate placement and positioning of such head suspensions or head suspension assemblies.

Figure 5:
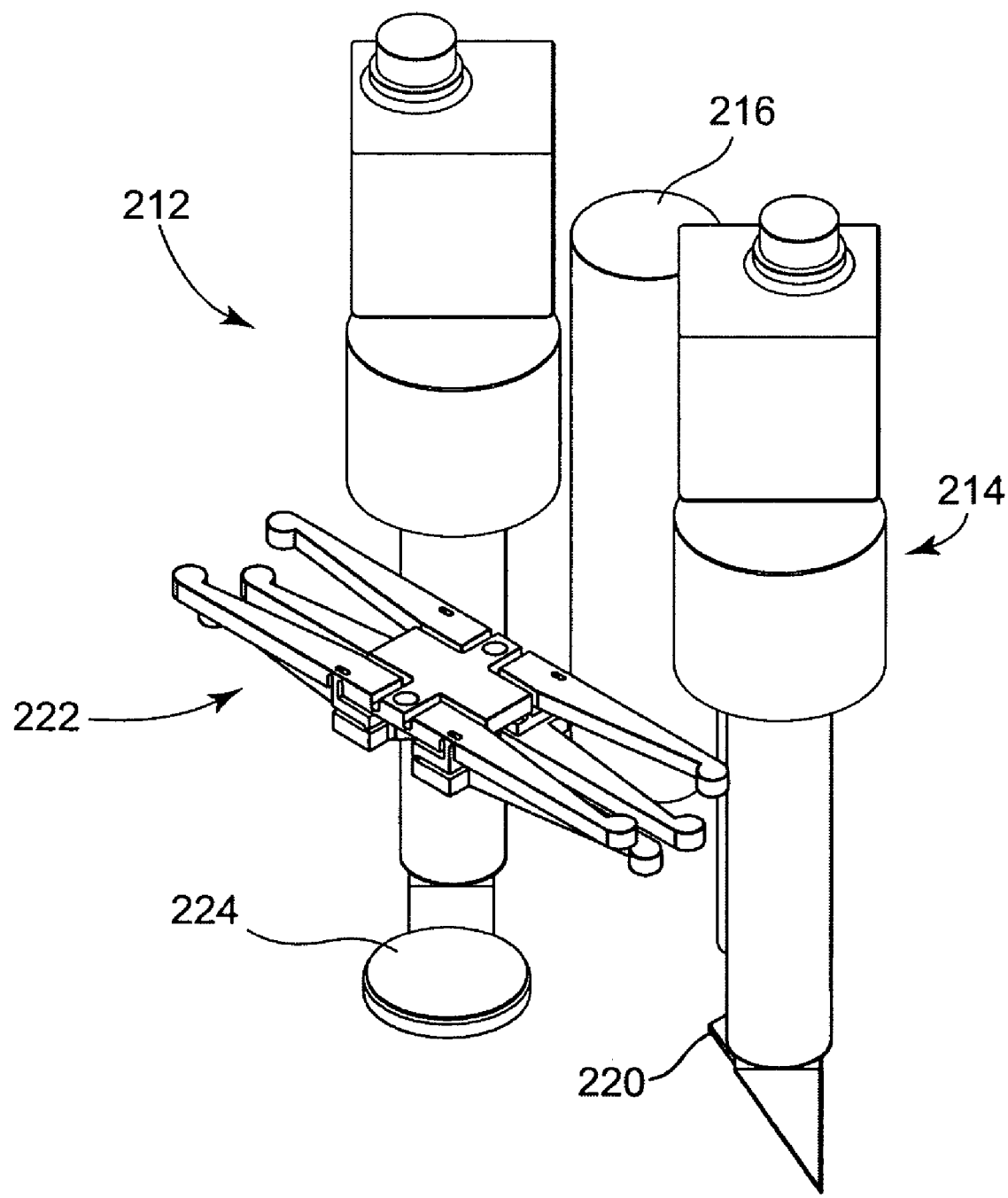
FIG. 5 is a perspective view of the optical measurement device of FIG. 4 with a housing of the device removed to show internal components of the optical measurement device and showing in particular a beam delivery system and an imaging system of the optical measurement device.
Figure 6:
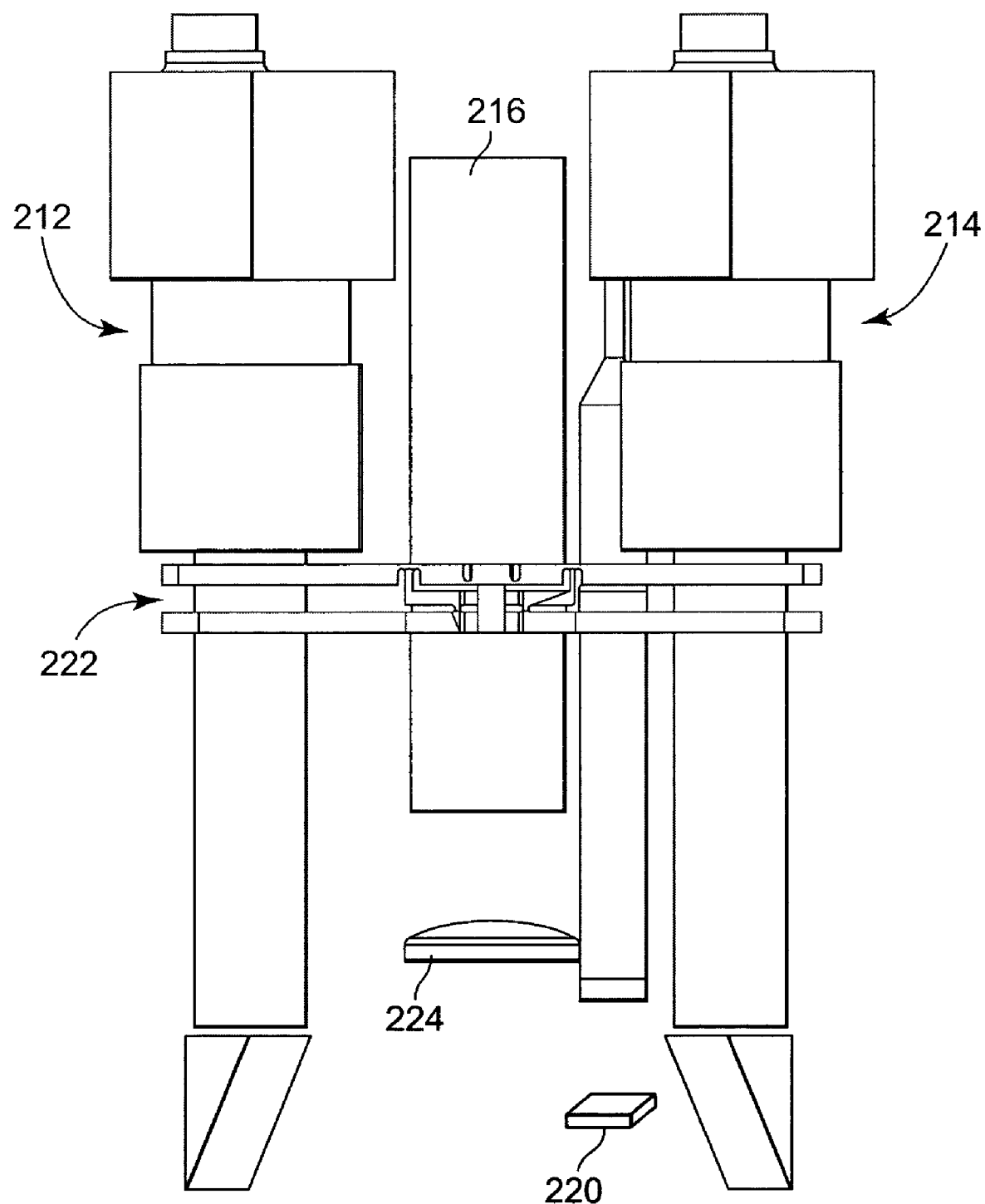
FIG. 6 is front view of the optical measurement device of FIG. 5.
Figure 7:
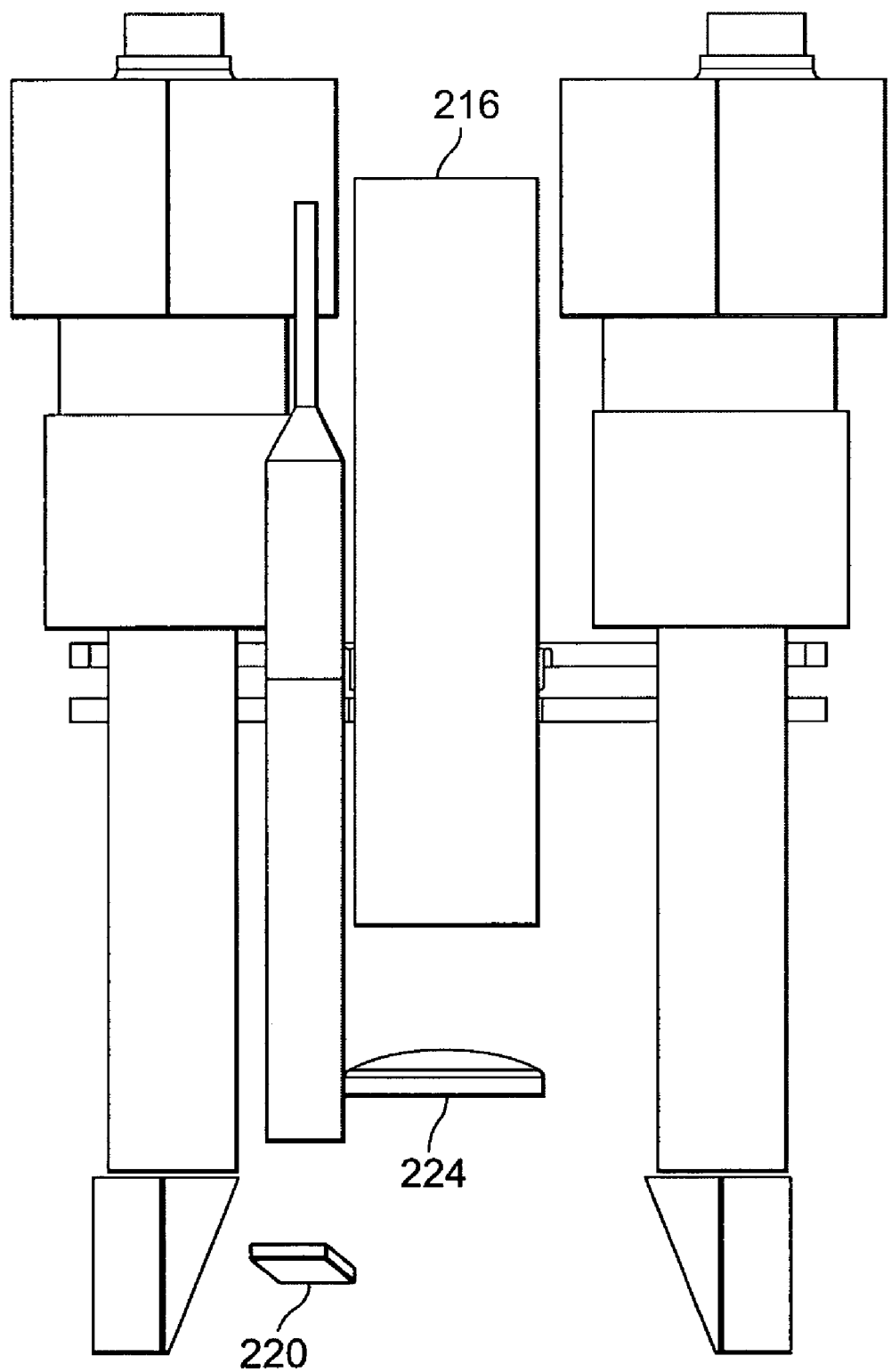
FIG. 7 is a rear view of the optical measurement device of FIG. 5.
Figure 8:
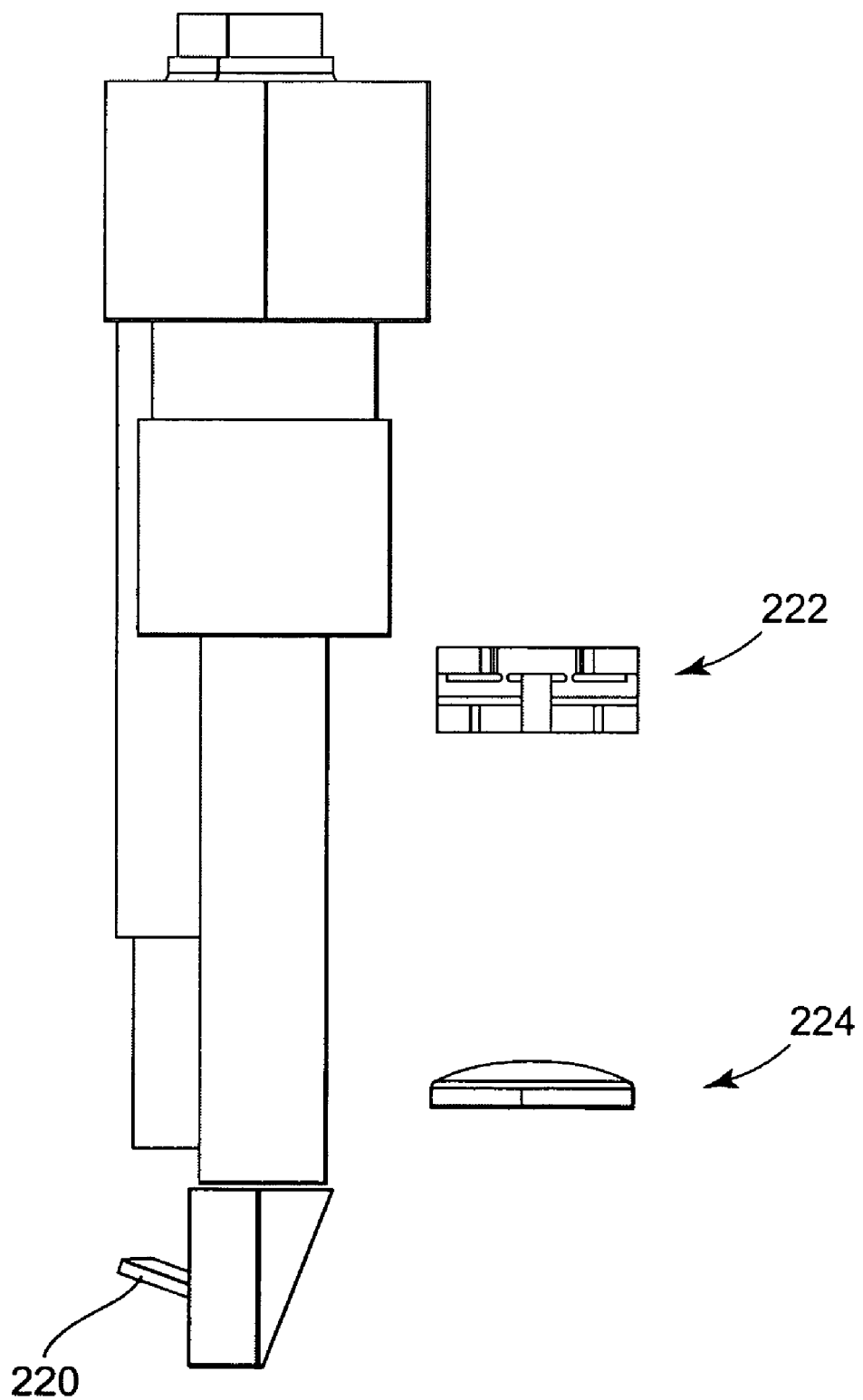
FIG. 8 is a left side view of the optical measurement device of FIG. 5.
Figure 9:
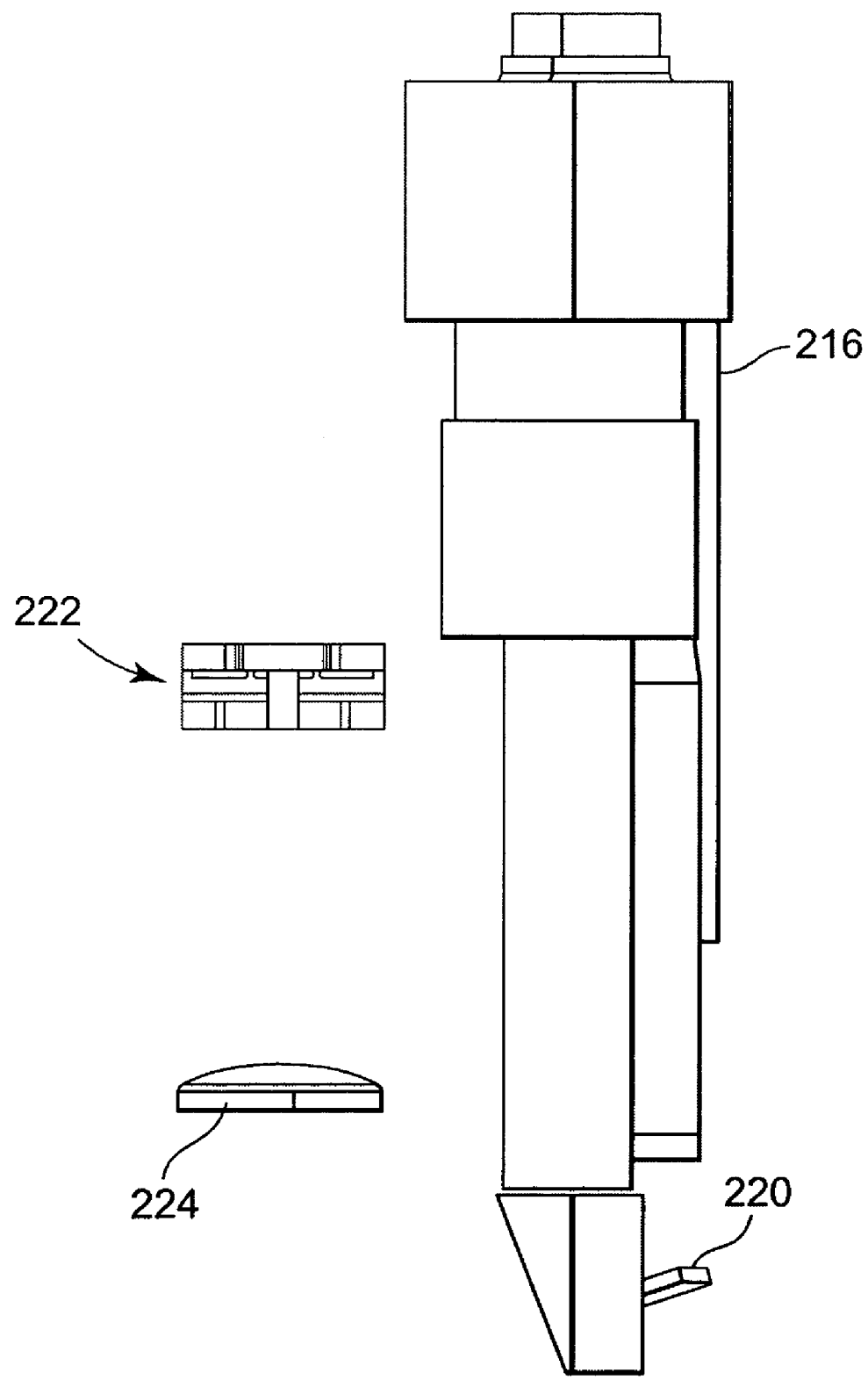
FIG. 9 is a right side view of the optical measurement device of FIG. 5.
Figure 10:
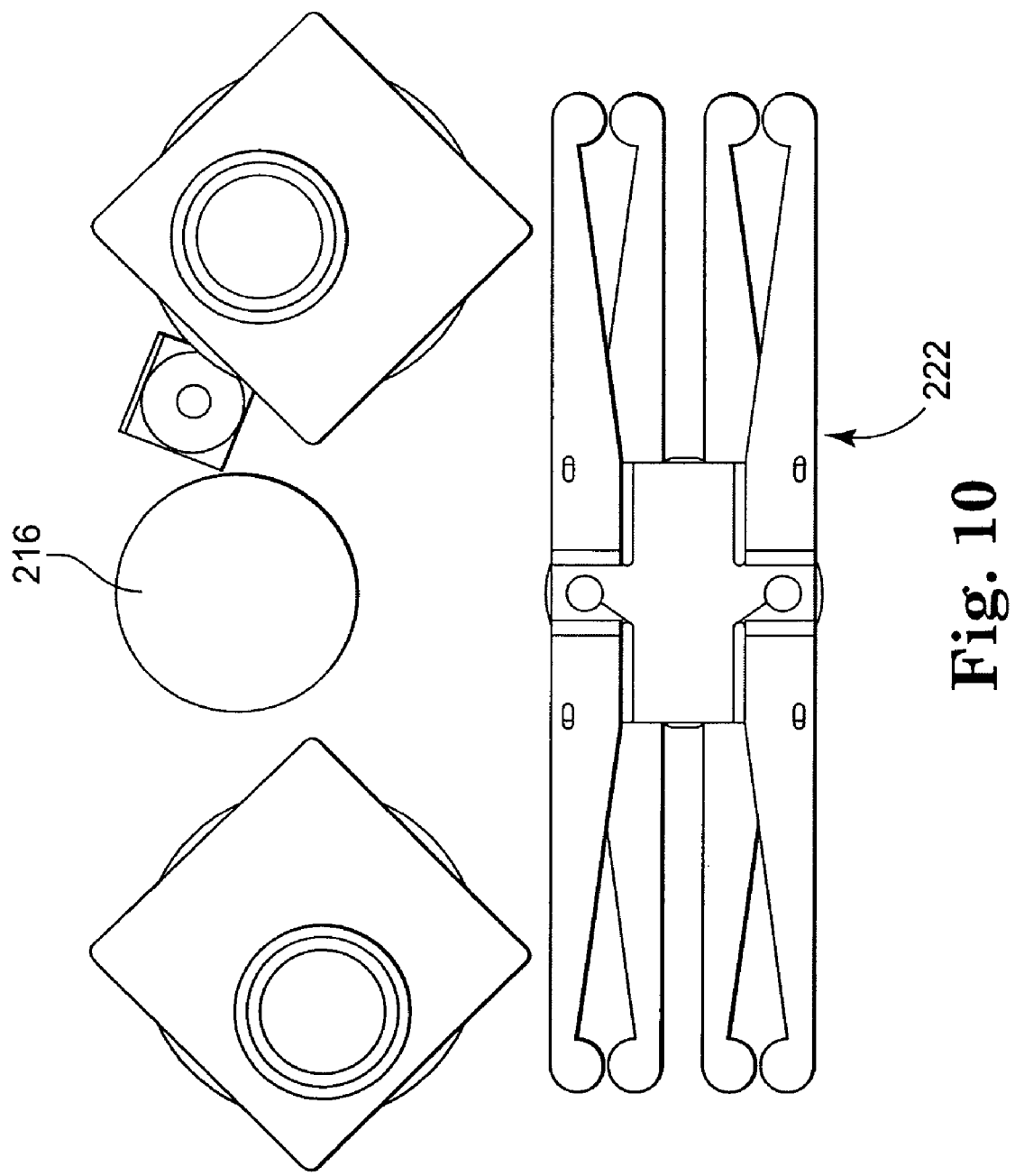
FIG. 10 is a top view of the optical measurement device of FIG. 5.
Figure 11:
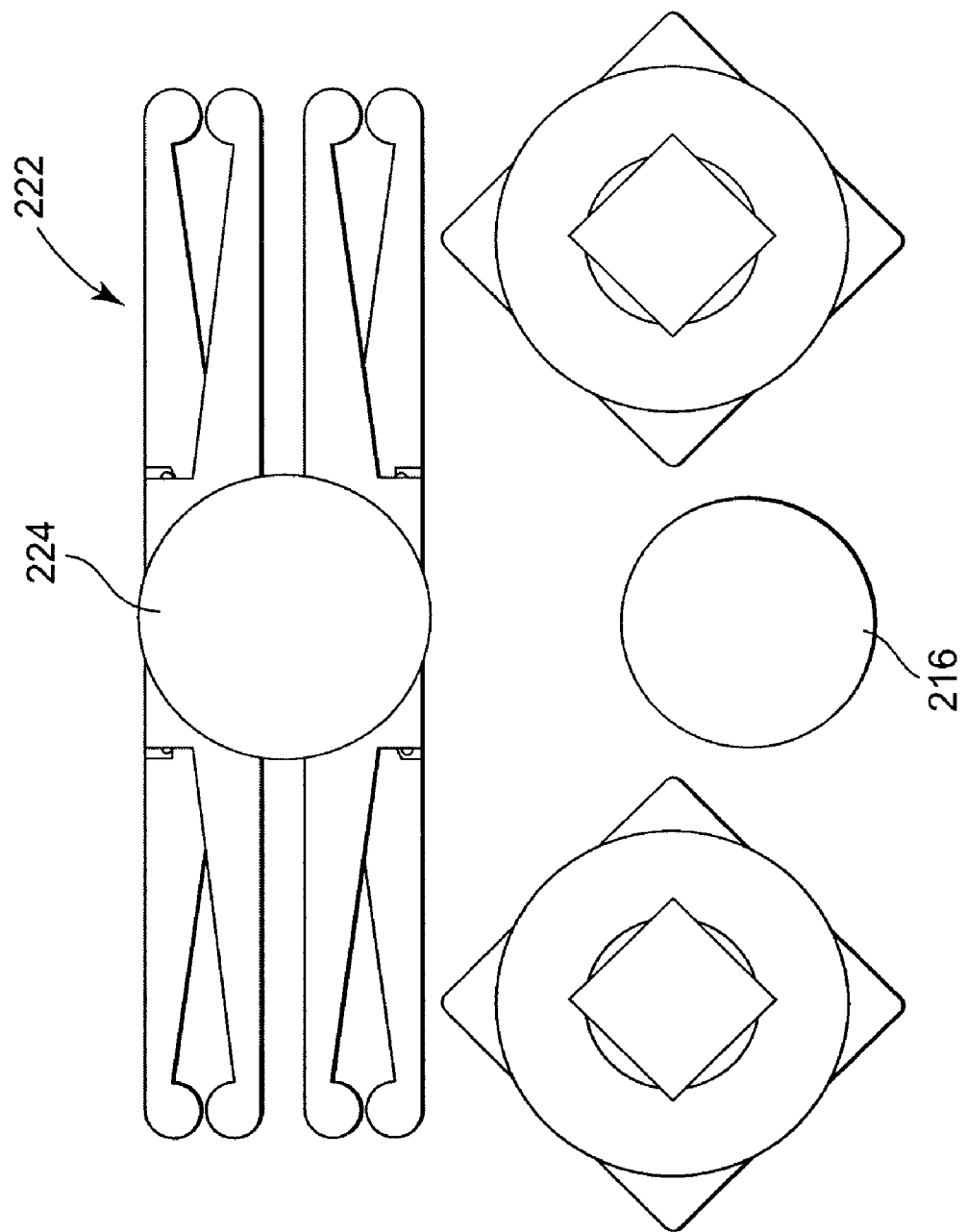
FIG. 11 is a bottom view of the optical measurement device of FIG. 5.

As shown in FIG. 4, the device 200 generally includes a housing 210 that encloses internal functional components of the device 200, which are described in more detail below. In FIG. 5, a perspective view of the device 200 is shown with the housing 210 removed so that such internal components of the device can be seen. Additional views of the device 200 are shown in FIGS. 5-11. Specifically, a front view is shown in FIG. 6, a rear view is shown in FIG. 7, a left side view is shown in FIG. 8, a right side view is shown in FIG. 9, a top view is shown in FIG. 10, and a bottom view is shown in FIG. 11. It is noted that the device 200 preferably includes internal mounting structure for mounting and positioning such internal components of the device 200 relative to each other in a functional manner in accordance with the present invention. Such mounting structure is not illustrated in order to more clearly illustrate the functional aspects and interrelationship of the internal components of the device 200. However, the internal components of the device 200 are generally shown in a preferred spatial arrangement with regard to each other.

Also, the exemplary device 200 is preferably designed to provide a compact, space-efficient device and the internal components of the device 200 are shown in an arrangement to provide a compact and functional device. It is noted, however, that the internal components of the device 200 can be spatially arranged in any functional manner in accordance with the present invention. In particular, the internal components of the device 200 do not need to be provided in the housing 210 as shown in FIG. 4.

Figure 12:
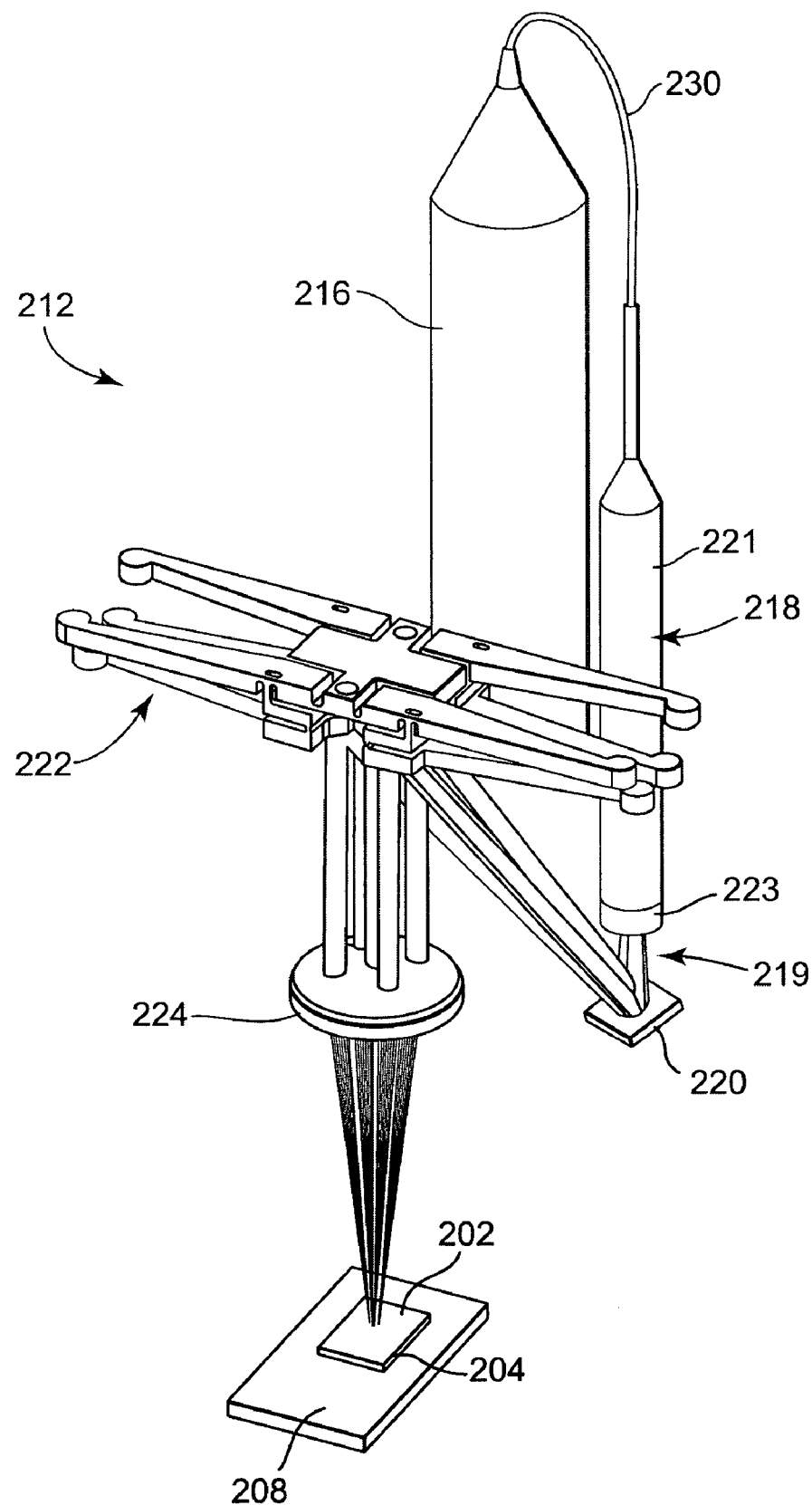
FIG. 12 is a perspective view of the beam delivery system of the optical measurement device of FIG. 5 showing in particular a plurality of measurement beams being directed to a surface of the workpiece by a beam steering device.
Figure 13:
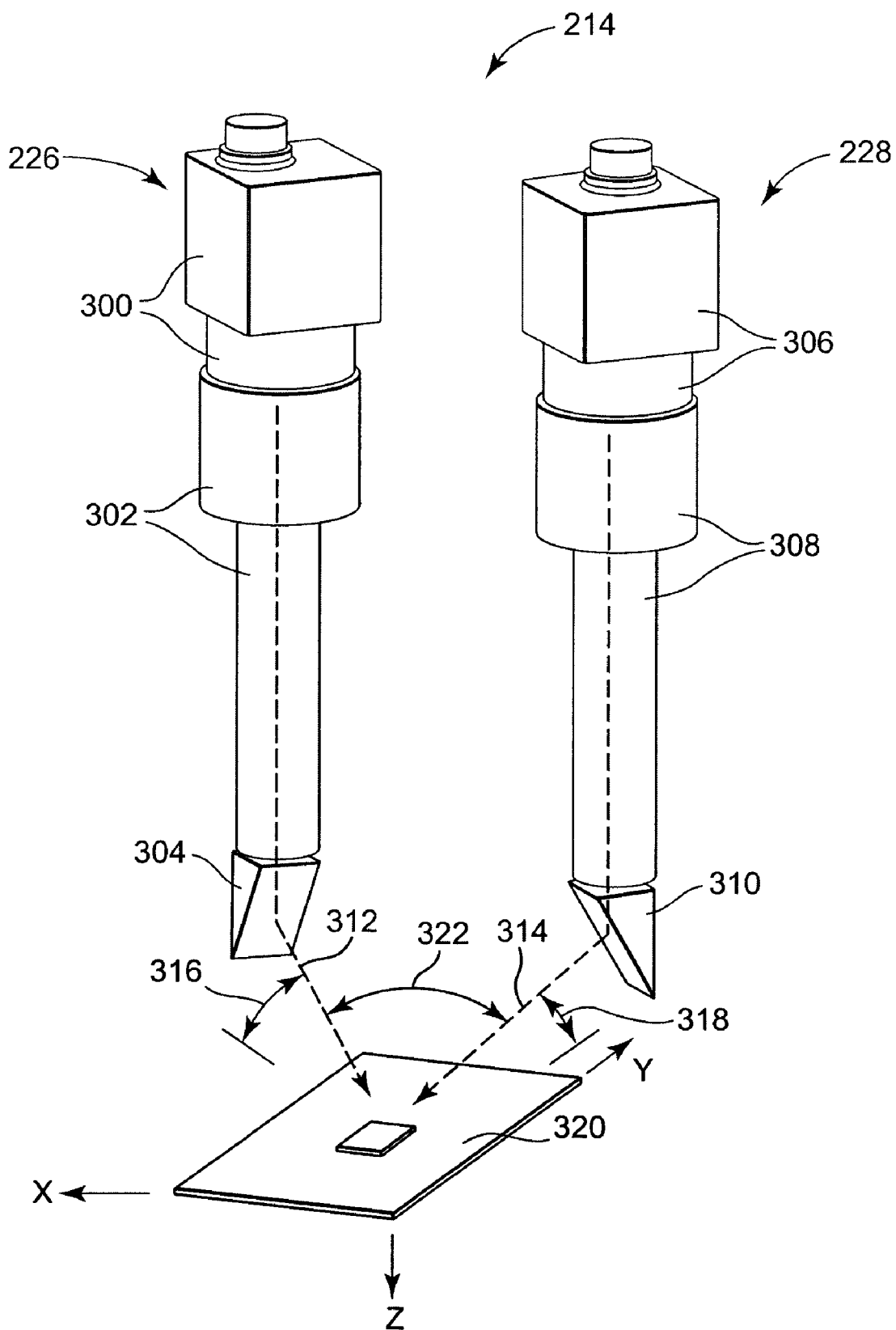
FIG. 13 is a perspective view of the imaging system of the optical measurement device of FIG. 5 showing in particular first and second imaging devices that can view one or more illuminated measurement locations on the surface of the component as provided by the beam delivery system of FIG. 12.

Referring to FIGS. 5-13 generally, the device 200 preferably includes a beam delivery system 212 and an imaging system 214. The beam delivery system 212 is illustrated in FIG. 12 without the imaging system 214 and generally includes a fiber laser 216, beam generator 218, mirror 220, beam steering device 222, and focusing lens 224. The beam generator 218 preferably includes a collimator 221 and a diffractive optic 223, as shown. The imaging system 214 is illustrated in FIG. 13 without the beam delivery system 212 and generally includes first and second viewing devices 226 and 228, respectively, which are described in more detail below.

Preferably, the fiber laser 216 and the beam generator 218 of the beam delivery system 212 cooperatively function to provide a plurality of measurement beams that can be delivered to the surface 202 of the component 204 as described in more detail below. It is noted, however, that any functionally equivalent optical components and/or system(s) that can provide a plurality of measurement beams in accordance with the present invention may be used. For example, beam splitters, plural diffraction optics devices, and plural lasers can be used. As shown in FIG. 12, the fiber laser 216 can supply a light beam to the collimator 221 of the beam generator 218 by an optic fiber 230 that connects the fiber laser 216 and the beam generator 218. The collimator 221 itself can be of conventional design to collimate the light beam and provides a collimated light beam to the diffractive optic 223. The diffractive optic 223 then preferably divides the collimated light beam into a plurality of independent measurement beams that are identified generally (as a plurality of beams) by reference numeral 219.

Preferably, the individual beams of the plurality of beams 219 are arranged in a predetermined pattern as described below. The plurality of beams 219 can then be redirected by mirror 220, as shown, to impinge upon the beam steering device 222. The beam steering device 222 is also described in detail below and is preferably designed so that it can steer at least one and preferably each beam of the plurality of beams 219 in a controllable manner within a predetermined area or operative working field. As shown, for example, each beam of the plurality of beams 219 is independently redirected by the beam steering device 222 to the focusing lens 224, which redirection is preferably done by independently controllable mirrors as is described in detail below. The focusing lens 224 then focuses the individual beams of the plurality of beams 219 to have a predetermined spot size that impinges on the surface 202 and illuminates a plurality of measurement locations on the surface 202. The steering device 222 may comprise plural independent steerable mirrors. Also, the mirror 220 may comprise plural reflecting portions and/or elements. Also, the focusing lens 224 may comprise plural lenses and/or elements.

As mentioned above, the fiber laser 216 and beam generator 218 (collimator 221 and diffractive optic 223) preferably function together to provide the plurality of beams 219. Preferably the fiber laser 216 provides a homogenous single mode beam that can be collimated and divided into the plurality of beams 219 by the collimator 221 and diffractive optic 223.

Preferably, the wavelength of the laser is selected so that it can illuminate a measurement location on the surface 202 of the component 204 that can be seen by the imaging system 214. That is, as describe below, the imaging system preferably includes one or more cameras that are sensitive to the red portion of the electromagnetic spectrum. As such, the fiber laser 216 preferably provides a beam having a wavelength in the red portion of the spectrum. Any wavelength can be used, however, as long as the imaging system 214 is designed for viewing such wavelength in accordance with the present invention. Also, the power of the fiber laser 216 can be selected by considering factors such as the geometry of the device 200, the number of beams to be used, the desired spot size of the beams, the surface characteristics of a component to be measured, and the desired brightness of the illuminated spots of the focused beams on the surface 202 of the component 204, for example. In any case, the fiber laser 216 preferably has sufficient power to provide a beam that can be divided into a predetermined number of measurement beams that can illuminate a predetermined number of measurement locations with sufficient brightness to be imaged in accordance with the present invention as described below. Any functionally equivalent optical components can be used to provide such illuminated spots.

The diffractive optic 223 functions to divide the beam supplied by the collimator 221 into the plurality of beams 219. Preferably, the diffractive optic 223 divides the beam from the collimator 221 so that each individual beam of the plurality of beams 219 has similar power. That is, the power of the beam from the fiber laser 216 is preferably equally distributed to each beam of the plurality of beams 219. However, it is noted that power can be unequally distributed among each beam of the plurality of beams 219 if desired. Such diffractive optics themselves are well known and are commercially available. The diffractive optic 223 is preferably selected as based on factors including the number of beams desired, the desired spatial arrangement for the beams, and an angle of divergence for the beams, if desired.

Figure 14:
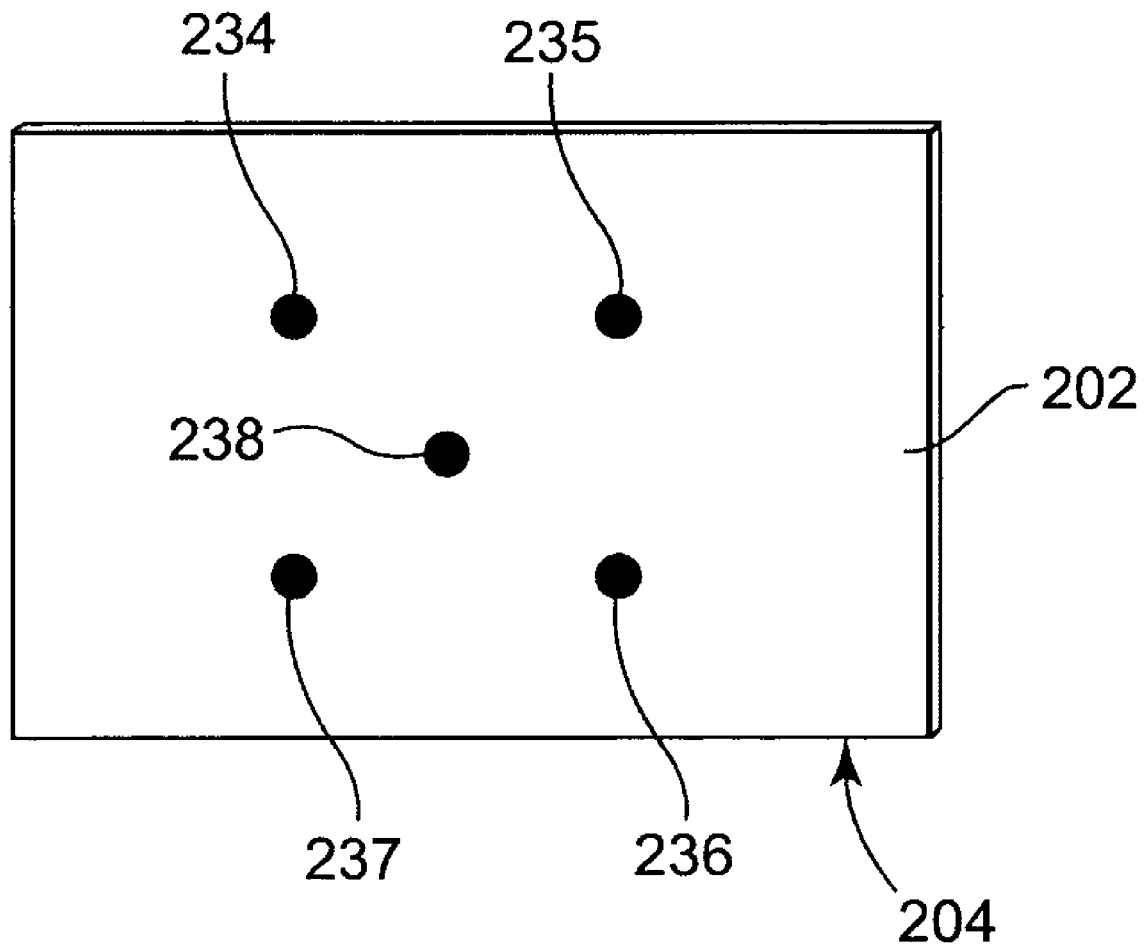
FIG. 14 is a schematic view of an exemplary arrangement of illuminated measurement locations as illuminated on a workpiece surface by the beam delivery system of FIG. 12.

Preferably, the diffractive optic 223 is designed to provide the plurality of beams 219 in a predetermined spatially arranged pattern. Any arrangement of the plurality of beams 219 may be used, however. Such pattern may be determined based on a particular component being measured. For example, the plurality of beams 219 shown in FIG. 12 comprises five individual beams arranged in a pattern that can best be seen in FIG. 14. In particular, FIG. 14 illustrates the surface 202 of the component 204 as impinged by the plurality of beams 219. As illustrated, the plurality of beams 219 illuminate measurement locations 234, 235, 236, 237, and 238 on the surface 202 of the component 204. As shown, the measurement locations 234, 235, 236, and 237 are arranged to form a square with the measurement locations 234, 235, 236, and 237 nominally positioned at the corners of the square. Measurement location 238 is preferably positioned at the center of the square, as illustrated. Preferably, as described in more detail below, the measurement locations 234, 235, 236, and 237 are controllably repositionable relative to the nominal positions provided by the diffractive optic 223. That is, the measurement locations 234, 235, 236, and 237 can preferably be moved around on the surface 202 of the component 204 by the steering device 222. The measurement location 238 is preferably stationary (provided in a fixed position relative to measurement locations 234, 235, 236, and 237) but is not required to be stationary and may be movable like the measurement locations 234, 235, 236, and 237. Moreover, any or all of the measurement locations 234, 235, 236, and 237 may be provided in a fixed, non-movable manner.

Any number of measurement beams (to provide any number of measurement locations), including a single measurement beam, arranged in any desired pattern, may be used in accordance with the present invention. As described in more detail below, a single beam (forming an illuminated measurement location) as viewed from two or more different directions can provide information related to the x, y, and z coordinates of the measurement location. Also, a plurality of beams as viewed from one or more directions can provide information related to a line or angular orientation of a surface. The number of beams and the pattern for the beams can be selected for a particular measurement on a particular portion of a component. For example, for measuring static attitude, three measurement locations are looked at to define a plane within a coordinate system. However, additional measurement locations may be used in order to provide redundant, comparison, or other information.

After the plurality of beams 219 exit from the diffractive optic 223, each individual beam of the plurality of beams 219 is preferably directed to the steering device 222 by the mirror 220 as illustrated in FIG. 12. Preferably, each individual beam of the plurality of beams 219 is directed to a distinct independently movable mirror of the steering device 222 for steering each individual beam of the plurality of beams 219 to a predetermined location relative to a portion of a component to be measured (such as the surface 202 of the component 204) as described in greater detail below. As such, each beam of the plurality of beams 219 can be independently positioned relative to the other beams. Preferably, the mirror 220 and the diffractive optic 223 are adjustably positionable relative to each other for aligning the plurality of beams 219 with the steering device 222. For example, the beam generator 218 may be rotatable, linearly translatable, and/or angularly movable relative to the mirror 220. Also, the mirror 220 may be positionably adjustable relative to the beam generator 218 such as by mounting the mirror 220 on a movable platform such as a tip-plate or the like. In any case, the device 200 is preferably designed so that the beam generator 218, mirror 220, and steering device 222 can be aligned for directing the plurality of beams 219 to the surface 202 of the component 204 in accordance with the present invention. Specific details of the steering device 222 are described below.

In FIG. 13, the imaging device 214 is shown without the beam delivery system 212. As shown, the viewing device 226 includes a camera 300, an imaging lens 302, and a prism 304, although any functionally equivalent system may be used, known or future developed, that can view the measurement location 206 in accordance with the present invention. Similarly, the viewing device 228 preferably includes a camera 306, an imaging lens 308, and a prism 310. The cameras 300 and 306 each preferably include a position sensing detector. Such detectors may include charge coupled devices (CCD's), complementary metal oxide semiconductor devices (CMOS devices), or any other device(s) or systems capable of sensing the position of an image formed on the device to function in a similar manner as described above with respect to the detectors 18, 66, and 70 of FIGS. 1 and 2.

The imaging device 214 is preferably designed to view the measurement position 206 from plural locations. The imaging device 214 is preferably designed so that the viewing device 226 can view the measurement position 206 along a first viewing direction 312 and so that the viewing device 228 can view the measurement position 206 along a second viewing direction 314. Such an arrangement is fundamentally similar to that described above and shown in FIG. 3.

The imaging lenses 302 and 308 preferably function to focus an image on the position sensing detectors of the cameras 300 and 306, respectively. The imaging lens 302 includes an optical viewing axis 312 along which an image can be provided to the position sensing detector of the camera 300. In the same manner, the imaging lens 308 includes an optical viewing axis 314 along which an image can be provided to the position sensing detector of the camera 306.

As illustrated, the prisms 304 and 310 preferably function to redirect the optical viewing axes of the imaging lenses 302 and 308, respectively. Any prism, such as commercially available prisms known as lithro prisms, or functionally equivalent devices may be used. By redirecting the optical viewing axes of the imaging lenses 302 and 308, the imaging lenses 302 and 308 can be provided along the z-direction in order to provide a compact, space-efficient design for the imaging device 214. However, the prisms 304 and 310 do not need to be used and the optical axes of the imaging lenses 302 and 308 may coincide with the viewing directions 312 and 314, respectively.

Like that described above with respect to FIG. 3, a known geometry for the device 200 is provided. In particular, the viewing directions 312 and 314 are preferably provided at known angles, 316 and 318 respectively, with respect to a reference surface 320 provided relative to the coordinate system. In one preferred embodiment of the present invention, an angle of 30 degrees is used for the angles 316 and 318 (as measured relative to a surface 320 of an x-y plane of the coordinate system, as shown). Any angle may be used. Also, different angles may be used for each of the viewing directions 312 and 314. Generally, as the angle decreases, resolution increases and range decreases. Thus, an angle of 30 degrees provides a preferable balance between resolution and range suitable for measuring components such as head suspensions and the like. The viewing directions 312 and 314 are also preferably provided at a known angle 322 with respect to each other. Preferably, an angle of 90 degrees is used as mentioned above in order to generally simplify the mathematics used to setup the device 200. Any angle may be used, however.

Figure 15:
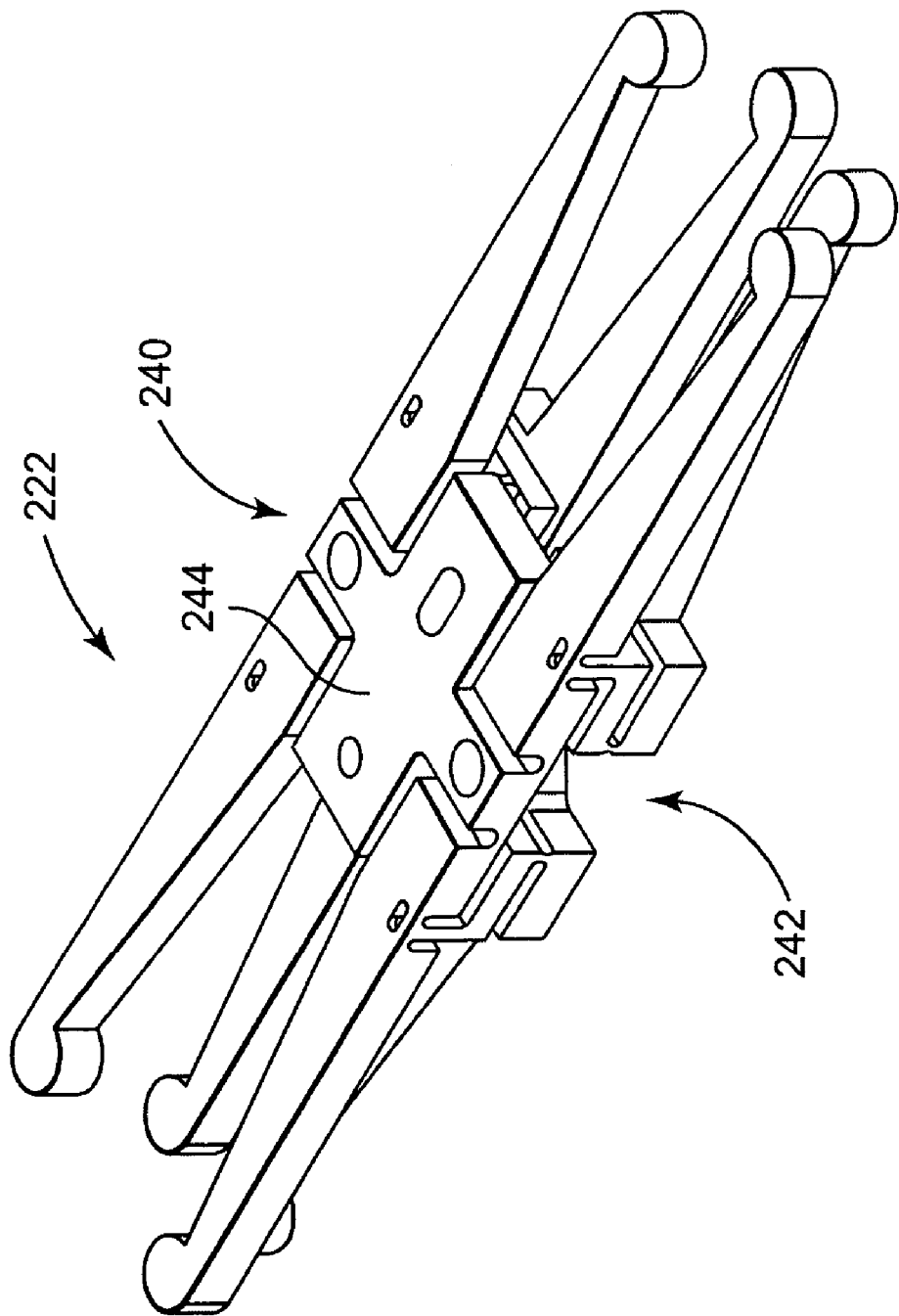
FIG. 15 is a perspective view of the beam steering device of the beam delivery system of FIG. 12 showing a top side of the steering device.

In FIG. 15, a perspective view of the steering device 222 is shown. The steering device 222 includes a mounting side 240 and a reflecting side 242, as illustrated. The mounting side 240 is preferably designed to mount the steering device 222 in a position to receive and steer the plurality of beams 219 in accordance with the present invention. Specifically, the steering device 222 is mounted relative to the mirror 220 and the focusing lens 224 as is illustrated in FIG. 12. In such a position the plurality of beams 219 can be directed to the reflecting side 242 of the beam steering device 222 as reflected by the mirror 220. The beam steering device 222 can then direct each of the individual beams of the plurality of beams 219 to the focusing lens 224 as is described in greater detail below. Each of the individual beams of the plurality of beams 219 can then be focused on the surface 202 of the component 204 to illuminate a plurality of measurement locations on the surface 202 (such as is described with regard to FIG. 14 above) which can be used in accordance with the present invention to determine spatial information about each of the measurement locations.

Figure 16:
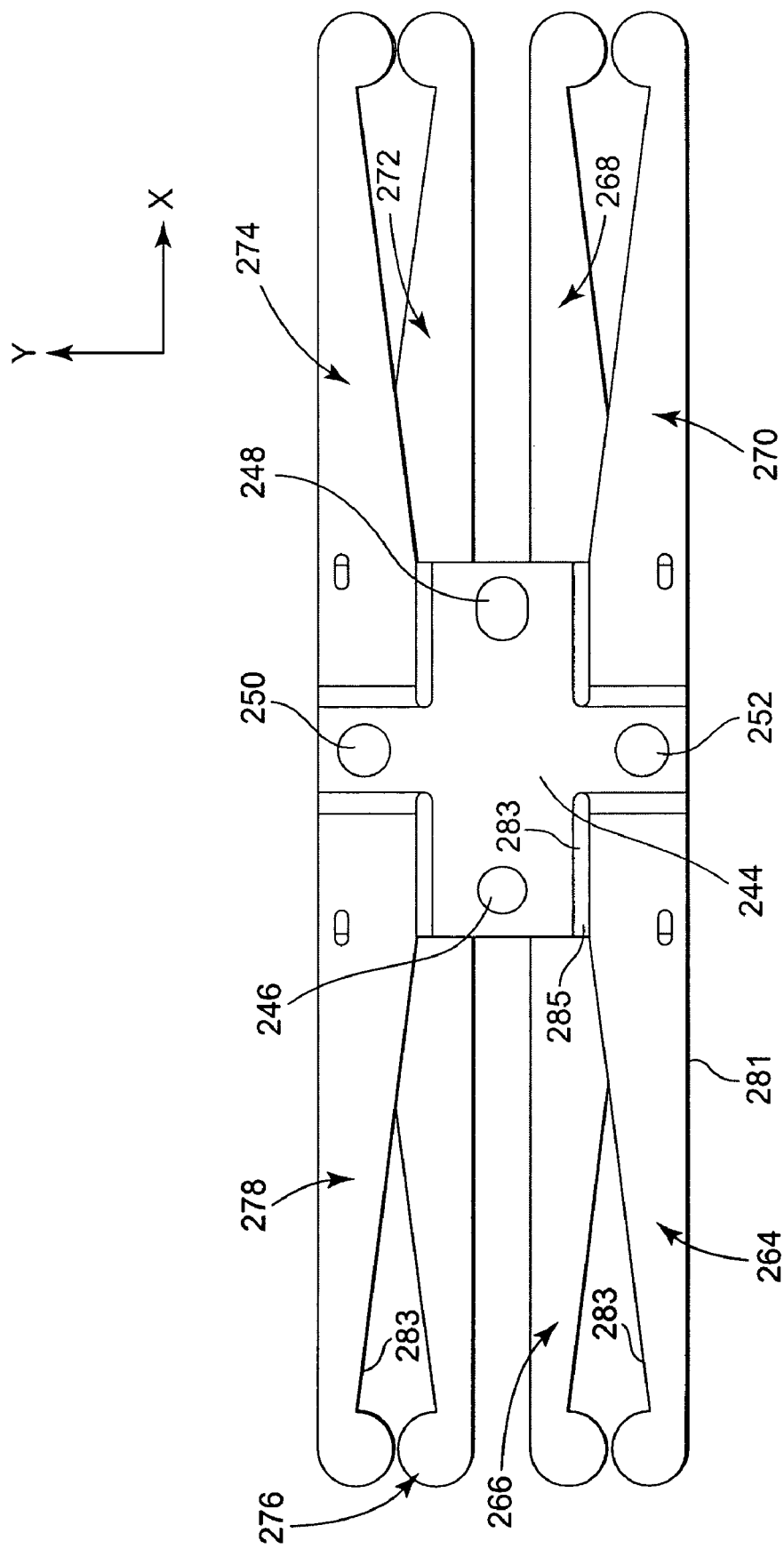
FIG. 16 is plan view of the top side of the steering device of FIG. 15.

Referring to FIG. 16, a top view of the steering device 222 is illustrated. As shown, the mounting side 240 preferably includes a mounting surface 244 that can be used to operatively mount the steering device 222 as described above. Preferably, as shown, the steering device 222 includes a precision hole 246 and a precision slot 248 that can be used for precision alignment of the steering device 222 relative to the mirror 220 and the focusing lens 224 as previously described. In particular, the hole 246 and the slot 248 are preferably designed to receive first and second alignment pins (not shown) that are preferably provided as part of a mounting structure (not shown) for the components of the beam delivery system 212. As shown, the steering device 222 also preferably includes mounting holes 250 and 252 that can be used to secure the steering device 222 to the mounting structure by using suitable fasteners or the like. Preferably, the hole 246 and the slot 248 provide an alignment function while the mounting holes 250 and 252 provide a securing or attachment function.

Figure 17:
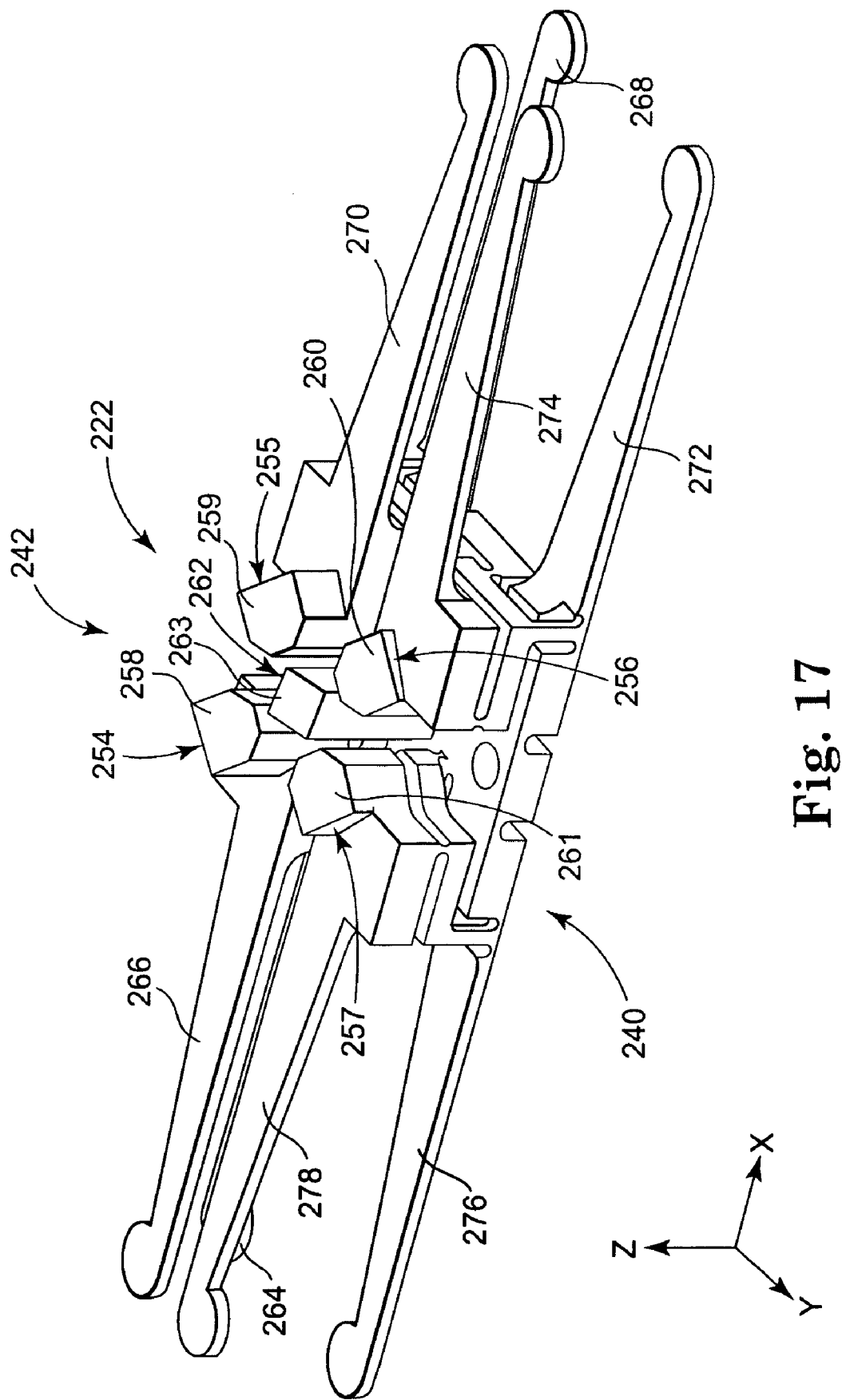
FIG. 17 is a perspective view of the steering device of FIG. 15 showing a bottom side of the steering device.
Figure 18:
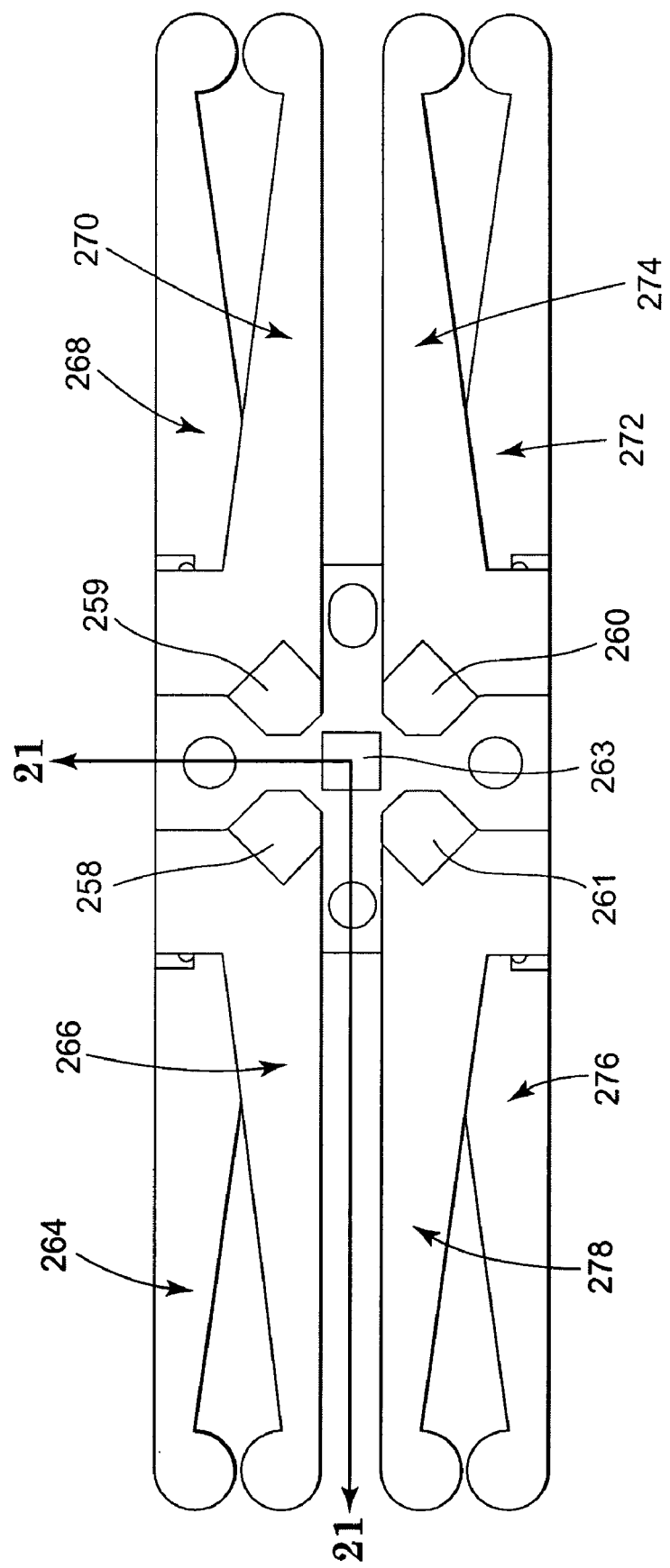
FIG. 18 is a plan view of the bottom side of the steering device of FIG. 17.
Figure 19:
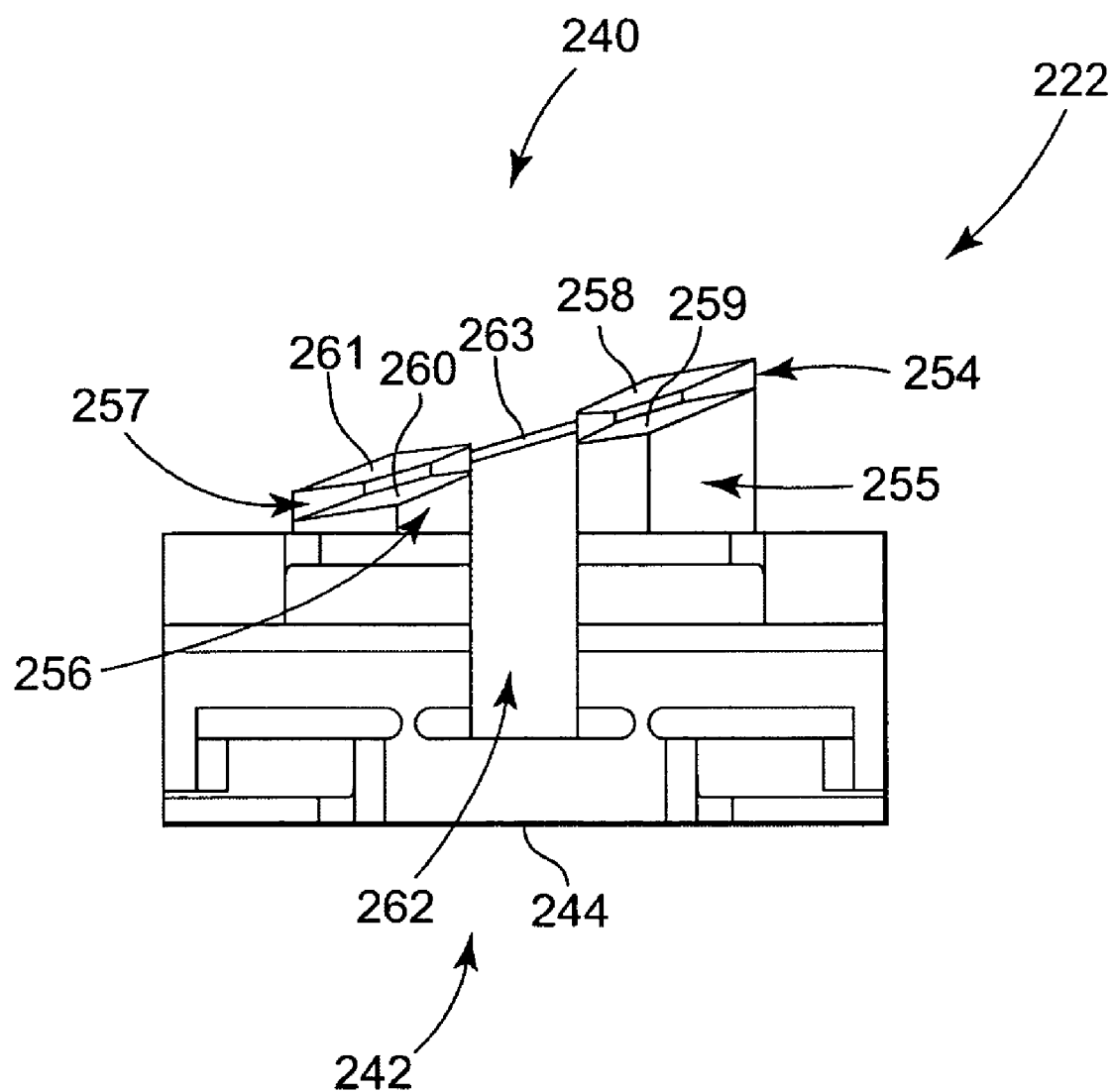
FIG. 19 is a right side view of the steering device shown in FIG. 17.
Figure 20:
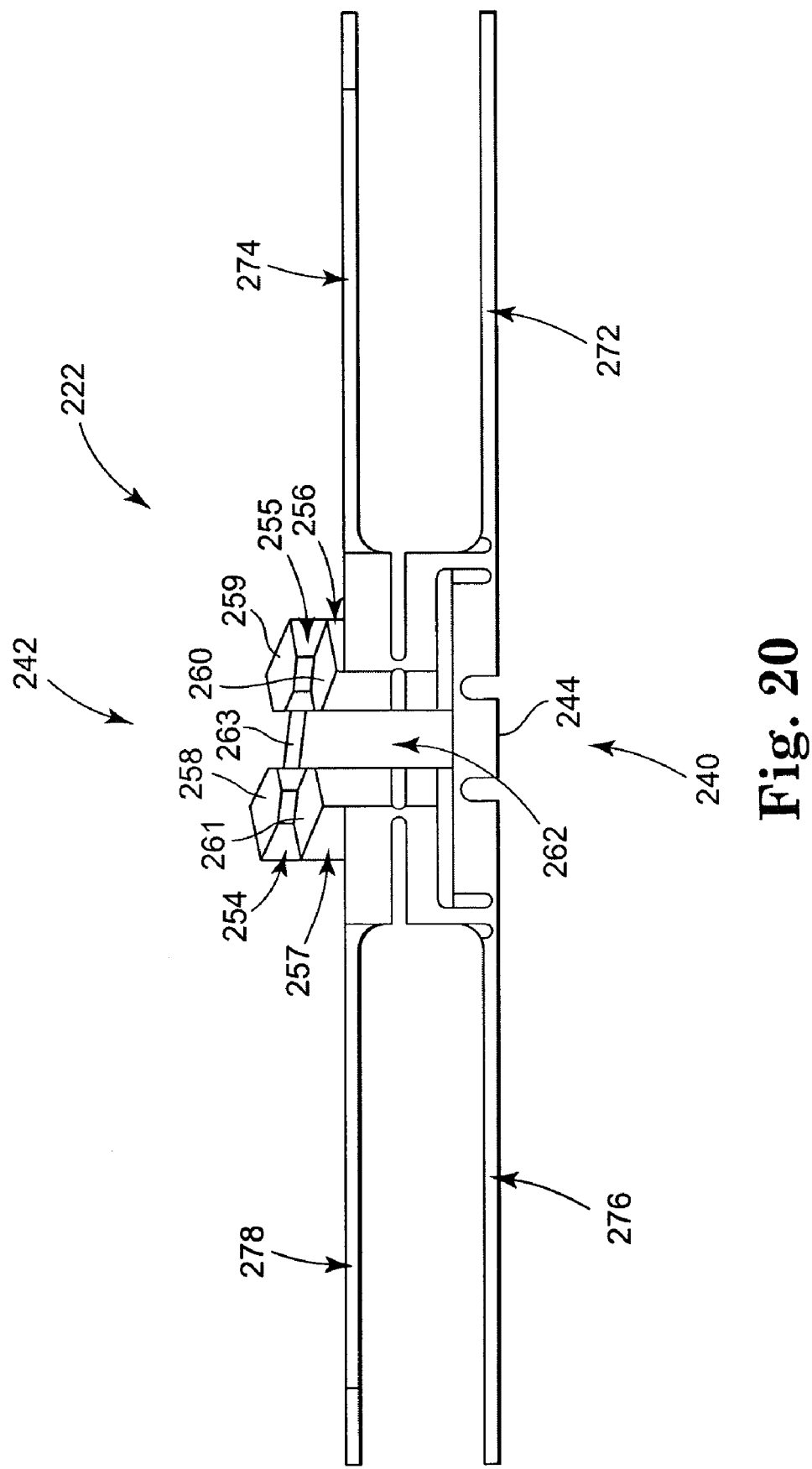
FIG. 20 is a front view of the steering device shown in FIG. 17.

In FIGS. 17 through 20 additional views of the steering device 222 are shown. In particular, FIG. 17 is a perspective view of the steering device 222 in a position generally reversed from that shown in FIG. 15 and shows the reflecting side 242 of the steering device 222 in greater detail., FIG. 18 is a top view of the steering device 222 shown in FIG. 17 and illustrates the reflecting side 242 in greater detail. FIG. 19 is a right side view of the steering device 222 with respect to the top view of the steering device 222 shown in FIG. 18 and FIG. 20 is a front side view of the steering device 222 with respect to the top view of the steering device 222 shown in FIG. 18.

Referring to FIG. 17, the reflecting side 242 of the steering device 222 preferably includes four movable mirror mounting posts, 254, 255, 256, and 257, as shown. The movable mirror mounting posts, 254, 255, 256, and 257, preferably include mirror mounting surfaces, 258, 259, 260, and 261, as shown. The steering device 222 also preferably includes a stationary mirror mounting post 262 that includes a mirror mounting surface 263, as shown. The movable mirror mounting posts, 254, 255, 256, and 257 and the stationary mirror mounting post 262 are provided for the purpose of supporting mirrors (not shown) for redirecting at least one beam of the plurality of beams 219 toward the focusing lens 224 after being reflected by the mirror 220 and as illustrated in FIG. 12. The movable mirror mounting posts, 254, 255, 256, and 257 are also preferably capable of steering a beam in accordance with the present invention and as described in greater detail below.

With respect to the redirecting function, the movable mirror mounting posts 254, 255, 256, and 257, as well as the stationary mirror mounting post 262 are preferably designed so that a mirror (not shown) can be operatively mounted or otherwise attached to each of the mounting posts, 254, 255, 256, 257, and 262 so that a desire orientation for redirecting a light beam of the plurality of beams 219 toward the focusing lens 224 can be provided. It is contemplated, however, that the mounting surfaces 258, 259, 260, 261, and 263 may be polished and/or coated with a thin film reflecting material in order to provide a functional reflecting surface in accordance with the present invention. Preferably, mirrors (not shown) are mounted to the mounting posts, 254, 255, 256, 257, and 262, so that the reflecting surfaces of the mirrors are parallel to the mounting surfaces, 258, 259, 260, 261, and 263, of the mounting posts, 254, 255, 256, 257, and 262.

As can be seen in FIGS. 17, 19, and 20 the mirror mounting surfaces, 258, 259, 260, 261, and 263, are each preferably provided at a predetermined spatial position and angular orientation relative to the mounting surface 244 of the steering device 222. The spatial position and angular orientation of the mirror mounting surfaces, 258, 259, 260, 261, and 263, relative to the mounting surface 244 are preferably designed to each redirect a light beam reflected by the mirror 220 toward the focusing lens 224 as shown in FIG. 12.

Preferably, the diffractive optic 223 of the beam generator 218 causes the plurality of beams 219 to diverge from each other after leaving the diffractive optic 223. The plurality of beams 219 continue to diverge from each other after being redirected by the mirror 220. The particular characteristics of the diffractive optic 223 (diverging angle, for example), the angular orientation of the mirror 220 relative to the mounting surface 244 of the steering device 222, and the relative position of the mirror 220 with respect to the mounting surface 244 of the steering device 222 are preferably considered in designing the spatial position and angular orientation for the mirror mounting surfaces, 258, 259, 260, 261, and 263, relative to the mounting surface 244 of the steering device 222.

With respect to the steering function of the steering device 222, each of the mirror mounting surfaces, 258, 259, 260, and 261, can preferably be moved for the purpose of steering a beam in accordance with the present invention. Referring to FIGS. 17 and 18, the steering device 222 includes a lower steering arm 264 and an upper steering arm 266, each being operatively associated with the mirror mounting surface 258 and that can be used to move the mirror mounting surface 258 as described in greater detail below. The steering device 222 also includes a lower steering arm 268 and an upper steering arm 270 operatively associated with the mirror mounting surface 259, a lower steering arm 272 and an upper steering arm 274 operatively associated with the mirror mounting surface 260, and a lower steering arm 276 and an upper steering arm 278 operatively associated with the mirror mounting surface 261.

Figure 21:
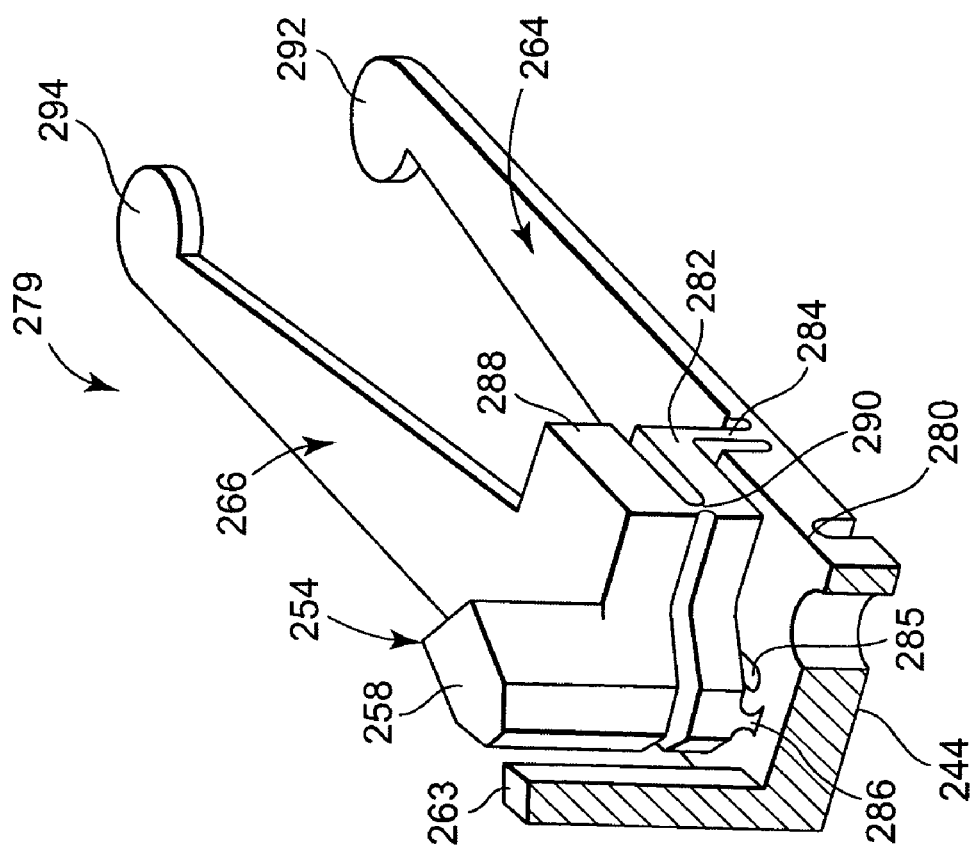
FIG. 21 is a section view of the steering device shown in FIG. 18 as taken along the lines 21-21.

In FIG. 21 a portion 279 of the steering device 222 defined by the section line 21-21 in FIG. 18 is illustrated. As shown, the lower steering arm 264 is movably connected to the steering device 222 by a hinge 280. As can be seen best by referring to FIGS. 16 and 21, the lower steering arm 264 comprises first and second sides, 281 and 283. As shown, the side 283 of the lower steering arm 264 is partially defined by a slot 285. The slot 285 allows the lower steering arm 264 to hinge about the hinge 280 as mounted by the mounting surface 244. The hinge 280 allows the lower steering arm 264 to hinge (preferably elastically) about the y-axis with respect to the mounting surface 244 of the steering device 222. Preferably, the hinge 280 is formed as a thinned portion of the lower steering arm 264, as shown.

The lower steering arm 264 is operatively connected to a lower tip plate 282 by a column portion 284. The lower tip plate 282 is also movably connected to the lower steering arm 264 by a hinge 286 that extends in the x direction. The hinge 286 allows the lower tip plate 282 to hinge about the x-axis with respect to the mounting surface 244 of the steering device 222. An upper tip plate 288 is also provided and is movably connected to the lower tip plate 282 by a hinge 290. The hinge 290 allows the upper tip plate 288 to hinge about the y-axis with respect to the mounting surface 244 of the steering device 222. Also, as illustrated, the upper steering arm 266 is functionally connected to the upper tip plate 288 for moving the upper tip plate 288 about the hinge 290. Also, the mirror mounting post 254 extends outwardly from the upper tip plate 288 as is shown.

In this arrangement, as a force is applied to an end 292 of the lower steering arm 264 in the direction of the z-axis, the lower steering arm 264 articulates about the y-axis as permitted by the hinge 280 and causes the lower tip plate 282 to rotate about the x-axis by the hinge 286 as driven by the column 284. This also causes the upper tip plate 288 to move together with the lower tip plate 282 thereby causing the mirror mounting surface 258 to rotate about the x-axis. In order to rotate the mirror mounting surface 258 about the y-axis, a force can be applied to an end 294 of the upper steering arm 266 along the z-axis. This causes the upper tip plate 288 to rotate about the y-axis by the hinge 290 thereby rotating the mirror mounting surface 258 to rotate about the y-axis. In this manner, the end 292 of the lower steering arm 264 and the end 294 of the upper steering arm 266 can be driven, independently or cooperatively, in any direction in the z-axis for changing the angular orientation of the mirror mounting surface 258 with respect to the mounting surface 244 of the steering device 222. A beam reflected by a mirror mounted on a mirror mounted surface 258 can be redirected and steered in a controllable manner in accordance with the present invention.

The end 292 of the lower steering arm 264 and the end 294 of the upper steering arm 266 can be driven in any desired manner. For example, a manually driven mechanical actuator such as a jack screw or the like may be used. Such screws may be driven such as by servo motors or the like. Moreover, electro-mechanical actuators such as piezoelectric devices or the like may be used. Preferably, a drive device is selected as based on a desired resolution and range of motion for controlling an angular orientation of the mirror mounting surfaces 258, 259, 260, and 261. Such driving devices may be connected to the ends of the steering arms (to provide driving in two directions) or may simply contact and positively drive the steering arms in a single direction. Motion in an opposite direction may be provided by spring or elastic characteristic of a hinge, for example.

The mirror mounting surfaces 259, 260, and 261 are preferably provided and driven in the same manner as described above with respect to the mirror mounting surface 258. The mirror mounting surfaces 259, 260, and 261 can be used to redirect and steer a beam in accordance with the present invention. Any number of mirror mounting surfaces may be driven and/or fixed depending on a desired application for device 200.

The device 200 can be used in many different applications. For example, one application relates to measuring certain performance parameters of head suspensions or head suspension assemblies as used in dynamic storage devices. Such performance parameters include z-height as well as static attitude. In use, a head suspension or head suspension assembly can be positioned in a measurement position 206 of the device 200 as shown in FIG. 4. A measurement location can be illuminated on a surface of a head suspension or head suspension assembly and any or all of the coordinates of the illuminated measurement location can be determined within a known coordinate system by the measurement device 200. In particular, the z coordinate of the illuminated measurement location can be used to determine a z-height of the surface of the head suspension or head suspension assembly with respect to a known position. By using plural measurement locations, lines (two measurement locations) and planes (three measurement locations) can be determined. For example, by providing three measurement locations on a surface of head suspension or head suspension assembly, an angular orientation of any surface or portion of a surface thereof can be determined within a known coordinate system. When the surface comprises a surface portion of a slider mounting tongue or a slider, the static attitude of the head suspension or head suspension assembly can be determined.

In accordance with the present invention, a plurality of measurement locations can be concurrently illuminated on a surface of a workpiece to be measured. Moreover, the plurality of measurement locations are preferably concurrently imaged by the imaging device 214 of the device 200. For example, when measuring static attitude, five measurement locations can be used as is illustrated in FIG. 14. Preferably, the measurement locations are arranged as shown in FIG. 14, that is, with four measurement locations at the corners of the square and the fifth measurement location at the center of the square. This pattern is preferred only because it is symmetric and generally correlates with the design of the steering device 222. With five such measurement locations, any three can be used to define a plane and the other locations can provide redundant information that can be used for averaging and/or error checking purposes or the like. However, any arrangement of any number of measurement locations can be used.

As described above, the exemplary measurement device 200 is designed with the capability to provide four repositionable measurement locations (234, 235, 236, and 237 as shown in FIG. 14) and a single stationary measurement location 238 as shown in FIG. 14. As noted, any number of measurement locations can be used and may be selected depending on the particular application for the device 200. Likewise, none of the measurement locations need to be movable nor does any particular one or more measurement locations need to be stationary. Measurement locations are preferably repositionable in accordance with the present invention in order to provide a versatile instrument that can to be used on a variety of components having various types of surfaces to be measured. In a preferred embodiment, at least one stationary measurement location is used that is provided from a measurement beam that is directed along the z-axis of the coordinate system. A fixed measurement beam as such, can be used as a reference in calibration and set up of the device 200.

The present invention has now been described with reference to several embodiments thereof The entire disclosure of any patent or patent application identified herein is hereby incorporated by reference for all purposes. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. An optical measurement device for determining at least one coordinate of a measurement location on a surface of a workpiece positioned in a known coordinate system by a workpiece support, the optical measurement device comprising:
    a source of a plurality of measurement beams;
    means for directing the plurality of measurement beams to concurrently impinge upon a surface of a workpiece to illuminate a plurality of independent predetermined measurement locations on the surface of the workpiece when the workpiece is supported and positioned by a workpiece support, said means for directing the plurality of measurement beams also providing for the adjustable directing of at least one of the measurement beams so that at least one measurement location can be movably positioned on the surface of a workpiece as supported in position by the workpiece support; and
    an imaging system comprising a detector that can view at least one of the plurality of illuminated measurement locations along a predetermined viewing direction;
    wherein the detector can be setup to provide information indicative of at least one coordinate of the at least one of the plurality of illuminated measurement locations as viewed by the imaging system along the predetermined viewing direction.

2. The device of claim 1, wherein the source of a plurality of measurement beams comprises at least one light source and at least one dividing device to divide the at least one light source into the plurality of measurement beams.

3. The device of claim 2, wherein the at least one light source comprises a laser light source.

4. The device of claim 3, wherein the at least one dividing device comprises a diffractive optic.

5. The device of claim 1, wherein the means for directing the plurality of measurement beams comprises at least one mirror capable of controllably positioning at least one of the plurality of measurement beams to impinge the workpiece surface at a predetermined location.

6. The device of claim 1, wherein the means for directing the plurality of measurement beams comprises a bank of independently movable mirrors.

7. The device of claim 6, wherein the means for directing the plurality of measurement beams comprises at least one stationary mirror.

8. The device of claim 1, further comprising a collimator operatively positioned between the source of a plurality of measurement beams and the means for directing the plurality of measurement beams.

9. The device of claim 1, further comprising a steering mirror for steering the plurality of measurement beams to the means for directing the plurality of measurement beams operatively positioned between the source of a plurality of measurement beams and the means for directing the plurality of measurement beams.

10. The device of claim 1, further comprising a focusing lens operatively positioned between the means for directing the plurality of measurement beams and the surface of the workpiece for focusing at least one of the plurality of measurement beams as directed by the means for directing the plurality of measurement beams.

11. The device of claim 1, wherein the imaging system comprises a camera that includes the detector.

12. The device of claim 1, wherein the imaging system comprises at least one additional detector that can view at least one of the plurality of illuminated measurement locations along a second predetermined viewing direction.

13. The device of claim 12, wherein the imaging system comprises a camera that includes the at least one additional detector.

14. An optical measurement device for determining at least one coordinate of a measurement location of a surface of a workpiece positioned in a known coordinate system by a workpiece support, the optical measurement device comprising:
a light source;
a beam divider operatively positioned with respect to the light source, the beam divider capable of dividing light from the light source into a plurality of independent measurement beams;
a steering device capable of adjustably positioning at least one of the plurality of measurement beams to impinge upon and illuminate a measurement location on a surface of a workpiece as supported by a workpiece support so that the measurement location can be movably positioned on the surface of a workpiece as supported in position by the workpiece support;
an imaging system comprising a detector that can view at least one of the plurality of illuminated measurement locations along a predetermined viewing direction; and
a control system for controlling the steering device and the imaging system wherein the control system comprises setup information so that the detector can provide information indicative of at least one coordinate of the illuminated measurement location as viewed by the imaging system along the predetermined viewing direction.

15. The device of claim 14, wherein the light source comprises a laser light source.

16. The device of claim 14, wherein the beam divider comprises a diffractive optic.

17. The device of claim 14, wherein the steering device comprises at least one mirror capable of controllably positioning the at least one of the plurality of measurement beams to impinge upon the workpiece surface at a predetermined location.

18. The device of claim 14, wherein the steering device comprises a bank of independently movable mirrors.

19. The device of claim 14, wherein the steering device comprises at least one stationary mirror.

20. The device of claim 14, further comprising a collimator operatively positioned between the light source and the steering device.

21. The device of claim 14, further comprising a steering mirror operatively positioned between the light source and the steering device for steering the plurality of measurement beams to the steering device.

22. The device of claim 14, further comprising a focusing lens operatively positioned between the steering device and the workpiece for focusing at least one of the plurality of measurement beams as directed to the workpiece surface by the steering device.

23. The device of claim 14, wherein the means for directing the plurality of measurement beams comprises at least one stationary mirror.

24. The device of claim 14, further comprising at least one additional detector that can view the illuminated measurement location along a second predetermined viewing direction.

25. The device of claim 24, wherein the imaging system comprises a camera that includes the at least one additional detector.

26. A method for determining at least one coordinate of a measurement location of a surface of a workpiece positioned in a known coordinate system by a workpiece support, the method comprising the steps of:
providing a workpiece;
supporting and positioning the workpiece on a workpiece support within a predetermined coordinate system;
directing a measurement beam with at least one steering device to impinge upon a surface of the workpiece and illuminate a predetermined measurement location on the surface of the workpiece, and adjusting the position of the measurement location on the surface of the workpiece by adjusting the directing of the measurement beam;
viewing the illuminated measurement location along a predetermined viewing direction within the predetermined coordinate system; and
determining at least one coordinate of the illuminated measurement location in the predetermined coordinate system by using setup information related to the predetermined viewing direction within the predetermined coordinate system.

27. The method of claim 26, comprising the step of concurrently impinging a surface of the workpiece with a plurality of measurement beams, each measurement beam concurrently illuminating an independent measurement location on the surface of the workpiece.

28. The method of claim 27, comprising providing at least one light source.

29. The method of claim 27, further comprising the step of collimating the at least one light source.

30. The method of claim 27, further comprising the step of dividing the at least one light source with a dividing device to provide at least a portion of the plurality of measurement beams.

31. The method of claim 30, wherein the step of dividing the at least one light source comprises diffractively dividing the at least one light source.

32. The method of claim 30, further comprising the step of steering light from the at least one light source to the dividing device.

33. The method of claim 30, further comprising the step of controllably directing at least one of the plurality of measurement beams to a measurement location on the surface of the workpiece support.

34. The method of claim 30, further comprising the step of focusing at least one of the plurality of measurement beams before impinging the surface of the workpiece support with the at least one of the plurality of measurement beams.

35. The method of claim 26, further comprising the step of selecting a spatial arrangement for the measurement locations of the plurality of measurement beams based on a particular surface of a workpiece.

36. A method for determining the angular orientation of a surface of a workpiece positioned in a known coordinate system, the method comprising the steps of:
provoding a workpiece;
supporting and positioning the workpiece on a workpiece support within an x-y-z coordinate system;
concurrently impinging a surface of the workpiece with at least three light beams to concurrently illuminate three independent measurement locations on the surface of the workpiece, and adjusting the position of at least on of the measurement locations on the surface of the workpiece by adjusting the directing of a measurement beam;
viewing the three independent illuminated measurement locations along first and second distinct viewing directions within the x-y-z coordinate system; and
determining the x, y, and z coordinates of each of the three independent illuminated measurement locations.

37. The method of claim 36, further comprising viewing at least one illuminated location having known x, y, and z coordinates in the x-y-z coordinate system along the first and second distinct viewing directions within the x-y-z coordinate system.

38. The method of claim 36, further determining at least the x and y coordinates of at least one of the three independent measurement locations by using information from both of the first and second distinct viewing directions.

39. The method of claim 36, further determining the z coordinate of at least one of the three independent measurement locations a first time by using information from the first viewing direction and determining the z coordinate of the same at least one of the three independent measurement locations a second time by using information from the second viewing direction.

* * * * *